United States Patent [19]

McLaughlin et al.

[11] Patent Number: 5,905,476
[45] Date of Patent: May 18, 1999

[54] ITU/TDD MODEM

[75] Inventors: Thomas J. McLaughlin, Salt Lake City; James E. Messinger, Sandy; Ronald J. Nelson, Salt Lake City, all of Utah

[73] Assignee: NXi Communications, Inc., Salt Lake City, Utah

[21] Appl. No.: 08/586,567

[22] Filed: Jan. 16, 1996

Related U.S. Application Data

[63] Continuation-in-part of application No. 08/281,341, Jul. 26, 1994, abandoned, which is a continuation-in-part of application No. 08/270,657, Jul. 5, 1994, abandoned.

[51] Int. Cl.[6] ........................................................ G09G 5/00
[52] U.S. Cl. ............................... 345/1; 345/123; 345/115; 704/2
[58] Field of Search ................................... 345/1, 2, 115, 345/123; 395/751, 753, 326, 329, 330, 331, 332; 704/2, 3, 5

[56] References Cited

U.S. PATENT DOCUMENTS

| | | |
|---|---|---|
| 3,644,896 | 2/1972 | Chaddha . |
| 4,215,243 | 7/1980 | Maxwell . |
| 4,268,721 | 5/1981 | Nielson et al. . |
| 4,432,837 | 2/1984 | Engelke et al. . |
| 4,466,106 | 8/1984 | Serrano . |
| 4,471,489 | 9/1984 | Konetski et al. . |
| 4,782,498 | 11/1988 | Copeland, III . |
| 4,805,132 | 2/1989 | Okamoto et al. ........................ 345/115 |
| 4,839,829 | 6/1989 | Freedman ................................ 395/329 |
| 4,924,456 | 5/1990 | Maxwell et al. . |
| 4,959,847 | 9/1990 | Engelke et al. . |
| 5,023,905 | 6/1991 | Wells et al. . |
| 5,029,198 | 7/1991 | Walpole et al. . |
| 5,065,427 | 11/1991 | Godbole . |
| 5,081,673 | 1/1992 | Engelke et al. . |

(List continued on next page.)

OTHER PUBLICATIONS

"The Whole Internet" by Ed Krol, Oriel;y & Associates, Inc, Jul. 1993.
"Team for DOS/Windows Combo", Futurus Corp, 1992.
"IRC: Ireshi" by Elizabeth M Ried, University of Melbourne Department of History, Honours Thesis, 1991.
"Internet Chat Relay Protocal", Network Working Group, J. Oikarinen and D. Reed, May 1993.
Brochure for NexCom I modem, marketed by Nexion, Inc., undated (two pages).
Brochure for Superprint modem, marketed by Ultratec, undated (two pages).
Brochure for MIC300i modem, marketed by Microflip, Inc., undated (two pages).

*Primary Examiner*—Richard A. Hjerpe
*Assistant Examiner*—Kent Chang
*Attorney, Agent, or Firm*—Madson & Metcalf

[57] ABSTRACT

A modem system includes an ITU/TDD/VOICE modem or other modem that is connected to a local computer and a telephone line. The ITU/TDD/VOICE modem allows transmission and reception of ITU, TDD, and voice signals over the telephone line to and from a remote device (such as a remote TDD, ITU modem, or telephone). The modem system may include one or more of the following features. The modem system may be used in a network whereby an indicator on a display screen indicates sound energy received by the modem over the line. The modem system may allow speed jumps from one speed to another during a call. The modem system includes a display in which the screen is split into two vertical areas, to display text sent between remote computers. The text sent by one computer is displayed in the right vertical area, while the text of the other computer is displayed in the left area. The vertical placement of the texts are based on the relative time in which they were sent to the other person. The modem system may also provide a special provision for 300 BPS connections, voice recognition, typing during a file transfer, and prevention of file transfers and/or high speed transfers. A local modem may communicate control information to a remote modem to, for example, synchronize protocol settings.

20 Claims, 9 Drawing Sheets

U.S. PATENT DOCUMENTS

| | | |
|---|---|---|
| 5,121,421 | 6/1992 | Alheim . |
| 5,163,081 | 11/1992 | Wycherley et al. . |
| 5,200,988 | 4/1993 | Riskin . |
| 5,311,578 | 5/1994 | Bremer et al. . |
| 5,325,417 | 6/1994 | Engelke et al. . |
| 5,327,479 | 7/1994 | Engelke et al. . |
| 5,343,515 | 8/1994 | Treffkorn . |
| 5,351,189 | 9/1994 | Dio et al. .................................. 345/123 |
| 5,351,288 | 9/1994 | Engelke et al. . |
| 5,361,296 | 11/1994 | Reyes et al. . |
| 5,473,674 | 12/1995 | Maeda . |
| 5,488,868 | 2/1996 | Murphy et al. ........................ 395/330 |
| 5,491,720 | 2/1996 | Davis et al. . |
| 5,544,300 | 8/1996 | Skarbo et al. ........................... 395/332 |
| 5,572,652 | 11/1996 | Robusto et al. ........................ 395/326 |

ITU/TDD MODEM

RELATED APPLICATIONS

This is a continuation-in-part of patent application Ser. No. 08/281,341, filed Jul. 26, 1994, now abandoned which is a continuation-in-part of patent application Ser. No. 08/270,657, filed Jul. 5, 1994, now abandoned.

GOVERNMENT RIGHTS

This present invention was developed in part through grant no. 2-R44-DC01457-02 from the National Institute on Deafness and other Communication Disorders (NIDCD) through the Small Business Innovation Research Program (SBIR). The United States Government may have some rights therein.

BACKGROUND OF THE INVENTION

1. Field of the Invention

The present invention relates to an ITU/TDD/VOICE modem and, more particularly, an ITU/TDD/VOICE modem that may operate in a stand alone mode, which includes an answering machine mode and a prestored outgoing message mode.

2. State of the Art

The telephone system or "public switched telephone network" (PSTN) was first developed in the late 1800's to allow for person to person communications by voice over long distances. The invention of computers made it useful to exchange digital data over the PSTN. In the 1950's, "modems" were developed for that purpose. A modem accepts digital data, modulates it into a form suitable for transmission over the PSTN such that a corresponding receiving modem can demodulate the signal back into the original digital data.

Modems provide a means for the deaf or speech impaired to communicate over the telephone system, since typed characters can be sent over the PSTN via modem and read by another modem user. However, standard modems have evolved with poor provision for communications by the deaf or speech impaired and are largely unsuitable for this purpose. Standard modems were developed primarily for computer to computer communications. For example, most standard modems have a "carrier" which is a constant audible signal. If this signal is lost because the call is placed on hold, a standard modem will generally hang up and cannot reestablish the connection with a different modem. Modems are very inflexible in their protocol requirements and will not operate properly or will abort the call if the protocol settings are wrong.

In the late 1960's, three deaf engineers developed a new type of very simple modem called a TDD or "telecommunication device for the deaf", sometimes called a TTY. A TDD is typically a stand alone modem system with an integral keyboard and display that allows typed characters to be exchanged with another TDD over the PSTN. Because of its simple protocol requirements, the TDD is robust and easy to use. Consequently, the TDD is, in many respects, more suitable than are standard modems for communications by the deaf.

The International Telecommunications Union ("ITU") (formerly known as the CCITT) has been active in setting various modulation standards for modems. Examples of ITU standards are V.21, V.22, V.22 Bis, V.32, V.32 Bis, and V.34. In the United States, prior to the adoption of ITU standards, various "Bell standards" were established. Examples of Bell standards are Bell 103 and Bell 212. As used herein, an "ITU modem" is a modem that may operate using an ITU modulation/demodulation protocol (or standard). Typically, ITU modems may also operate in at least one Bell modulation/demodulation protocol. A "Bell modem" may operate in a Bell modulation/demodulation protocol. Most modems currently being sold in the United States are ITU modems that are capable of transmitting and receiving in various ITU modulation/demodulation protocols as well as Bell modulation/demodulation protocols. The term "ASCII modem" is sometimes used to refer to an ITU or Bell modem.

As used herein, a "standard modem" is a modem other than a TDD that follows an established protocol such as an ITU or Bell modulation/demodulation protocol and transmits and/or receives data over a communication medium. The communication medium may be a telephone system (such as the PSTN), private branch exchange (PBX), or other media such as microwave link, coax, or fiber optic cable. ITU modems and Bell modems are examples of standard modems.

Differences between standard modems and TDDs include: (1) TDDs encode text characters with the generally obsolete five bit Baudot code, while most modems and desktop computers in the United States today use an ASCII encoding, also known as the ANSI X3.4-1977 or ASCII-77 encoding, (2) TDDs do not provide for parity bits, (3) TDD's in the United States transmit/receive only at 45.45 bits per second, and (4) TDDs use frequency shift keying modulation/demodulation at frequencies of 1400 and 1800 Hz. Because TDDs do not use ITU modulation and protocol schemes, TDDs and ITU modems are incompatible and cannot communicate with each other.

Dual purpose modems have been developed that can communicate with both TDDs and ITU modems. Some of these dual purpose modems have the capability to determine whether incoming and outgoings signals are in TDD format or standard modem format.

SUMMARY OF THE INVENTION

A modem system includes an ITU/TDD/VOICE modem or other modem that is connected to a local computer and a telephone line. The ITU/TDD/VOICE modem allows transmission and reception of ITU, TDD, and voice signals over the telephone line to and from a remote device (such as a remote TDD, ITU modem, or telephone). The modem system according to the present invention may include one or more of the following features. The modem system may be used in a network whereby an indicator on a display screen indicates sound energy received by the modem over the line. The modem system may allow speed jumps from one speed to another during a call. The modem system includes a display in which the screen is split into two vertical areas, to display text sent between remote computers. The text sent by one computer is displayed in the right vertical area, while the text of the other computer is displayed in the left area. The vertical placement of the texts are based on the relative time in which they were sent to the other person. The modem system may also provide a special provision for 300 BPS connections, voice recognition, typing during a file transfer, and prevention of file transfers and/or high speed transfers. Certain aspects of these features are described in detail in the specification below. A local modem may communicate control information to a remote modem to, for example, synchronize protocol settings.

An embodiment of the present invention includes an ITU/TDD/VOICE modem that is connected to a communications medium (such as a telephone line) and is connected to or internal to a local computer. The ITU/TDD/VOICE modem allows transmission and reception of ITU, TDD, and voice signals over the telephone line to and from a remote device. Examples of remote devices include a remote TDD and a remote ITU modem (which typically connects to or is internal to a remote computer). The ITU/TDD/VOICE modem may operate in various modes including (1) a computer communications mode and (2) a stand alone mode. During computer communications mode, the ITU/TDD/VOICE modem is controlled by the local computer. During stand alone mode, the ITU/TDD/VOICE modem operates independently of the local computer. The stand alone mode may further include an answering machine mode and/or a prestored outgoing message mode.

Under other embodiments of the invention, the ITU/TDD/VOICE modem or modem system includes various other features including one or more of the following which are described in detail in the specification: a particular utilization of the transmit/receive LED's in TDD mode; the ability to reacquire a new ITU or TDD connection from TDD mode (i.e., reacquisition mode); techniques for minimizing answer tone duration; techniques for modem status query; techniques for silencing Baudot or ITU modulation during voice carry over or hearing carry over; and uses for audio-in and audio-out connectors.

Different embodiments of the invention may include some but not others of the various modes and features described herein. The various modes and features may be employed in various combinations. For example, ITU modem that does not have TDD capabilities, may include answering machine mode, prestored outgoing message mode, and other features described herein. An ITU/TDD modem need not include voice capabilities. An ITU/VOICE modem need not include TDD capabilities. Facsimile capability may be included with any combination.

Various features described herein may be used independent of a TDD modem. For example, the split screen feature may be used between two modems (which may or may not be ITU modems) without any involvement with a TDD modem.

Various other aspects of the invention are described below.

The claims as originally filed or later added define the scope of the invention. Accordingly, if a feature described herein is not included in a particular claim, that claim should not be construed to include that feature.

DETAIL DESCRIPTION OF PREFERRED EMBODIMENTS

A. Circuitry and modes of operation

Figure 1:
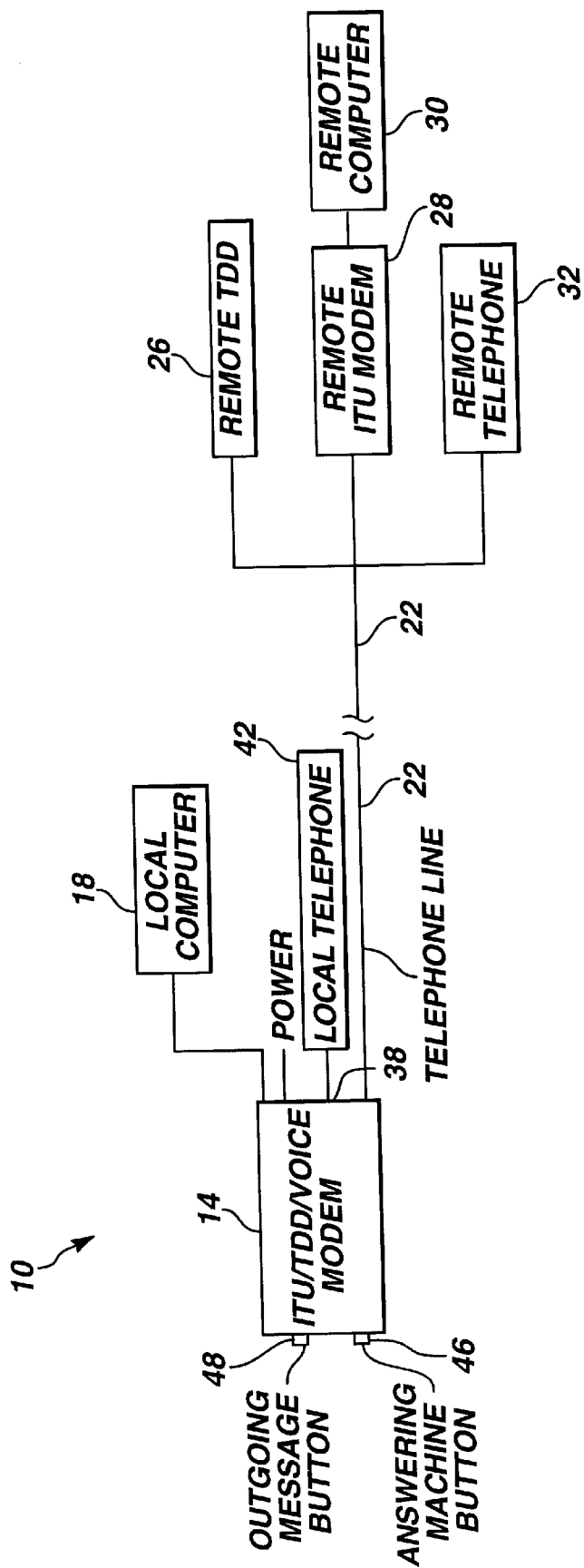
FIG. 1 is a schematic block diagram representation of an ITU/TDD/VOICE modem according to a preferred embodiment of the present invention in a communications system.

Referring to FIG. 1, a modem system 10 includes an ITU/TDD/VOICE modem 14 that is connected to a local computer 18 (which may be a desk top PC computer) and a telephone line 22. ITU/TDD/VOICE modem 14 is referred to as an ITU/TDD/VOICE modem because it allows transmission and reception of ITU, TDD, and voice signals over telephone line 22 to and from a remote device. However, as described in connection with FIG. 4, a modem according to the present invention could have ITU and TDD capabilities without also detecting, recording, or transmitting voice signals. As described in connection with FIG. 5, a modem according to the present invention could include ITU (or other standard modem) capabilities without detecting, recording, or transmitting TDD or voice signals. As described in connection with FIG. 6, a modem according to the present invention could include ITU/VOICE capabilities without detecting, recording, or transmitting TDD signals.

Examples of remote devices include a remote TDD 26, a remote ITU modem 28 (which connects to or is internal to a remote computer 30), and a remote telephone 32. The remote device could also include a facsimile machine. In that case, ITU/TDD/VOICE modem 14 could detect fax tones as well as Baudot or ITU answer tones. ITU/TDD/VOICE modem 14 can also detect voice signals. Voice signals could be stored on tape or in electronic memory.

ITU/TDD/VOICE modem 14 may include internal facsimile capability. A separate facsimile device may also be attached to the local PC, internal to the PC, or attached to the telephone line 22 on the local end. The circuitry of FIGS. 1–7 could support internal facsimile capability through modifying the firmware of a digital signal processing (DSP) chip 74, modem chip 142, and DSP chip 174.

The user of ITU/TDD/VOICE modem 14 and local computer 18 is referred to as the "local user" and the user of the remote device is referred to as the "remote user." ITU/TDD/VOICE modem 14 includes a "PHONE" connector 38 for connection to a line of an optional local telephone 42. The local user may use local telephone 42 in voice communications over telephone line 22 to, for example, remote telephone 32.

ITU/TDD/VOICE modem 14 may operate in various modes including (1) a computer communications mode and (2) a stand alone mode. During computer communications mode, ITU/TDD/VOICE modem 14 is controlled by local computer 18. During stand alone mode, ITU/TDD/VOICE modem 14 operates independently of local computer 18. For example, in stand alone mode, ITU/TDD/VOICE modem 14 may operate when (1) local computer 18 is turned off or (2) when local computer 18 is on, but the communications software of local computer 18 is not active with respect to ITU/TDD/VOICE modem 14.

As described below, stand alone mode may further be divided into an answering machine mode and a prestored outgoing message mode. ITU/TDD/VOICE modem 14 may be placed in an answering machine mode through activation of an answering machine control, which may be an answering machine button 46 or a software command. (Pressing button 46 may take ITU/TDD/VOICE modem 14 into answering machine mode, while pressing button 46 again may take ITU/TDD/VOICE modem 14 out of answering machine mode.) ITU/TDD/VOICE modem 14 may be placed in prestored outgoing message mode through activation of an outgoing message control, which may be an outgoing message button 48 or a software command.

The control of the stand alone answering machine and prestored outgoing message could be through a variety of techniques other than or in addition to a button. For example, ITU/TDD/VOICE modem 14 could include electromagnetic receivers that allow activation through a remote transmitter. Another remote technique would be to control these modem modes through a computer network, either in conjunction with local computer 18 or by another network controlled device. These remote means would be particularly useful for activating the prestored outgoing message mode.

ITU/TDD/VOICE modem 14 could also be controlled through telephone line 22 from a remote device such as remote telephone 32 or a remote ITU or TDD modem. This may be particularly useful to activate the answering machine mode or to retrieve answering machine messages from a remote location.

Figure 2:
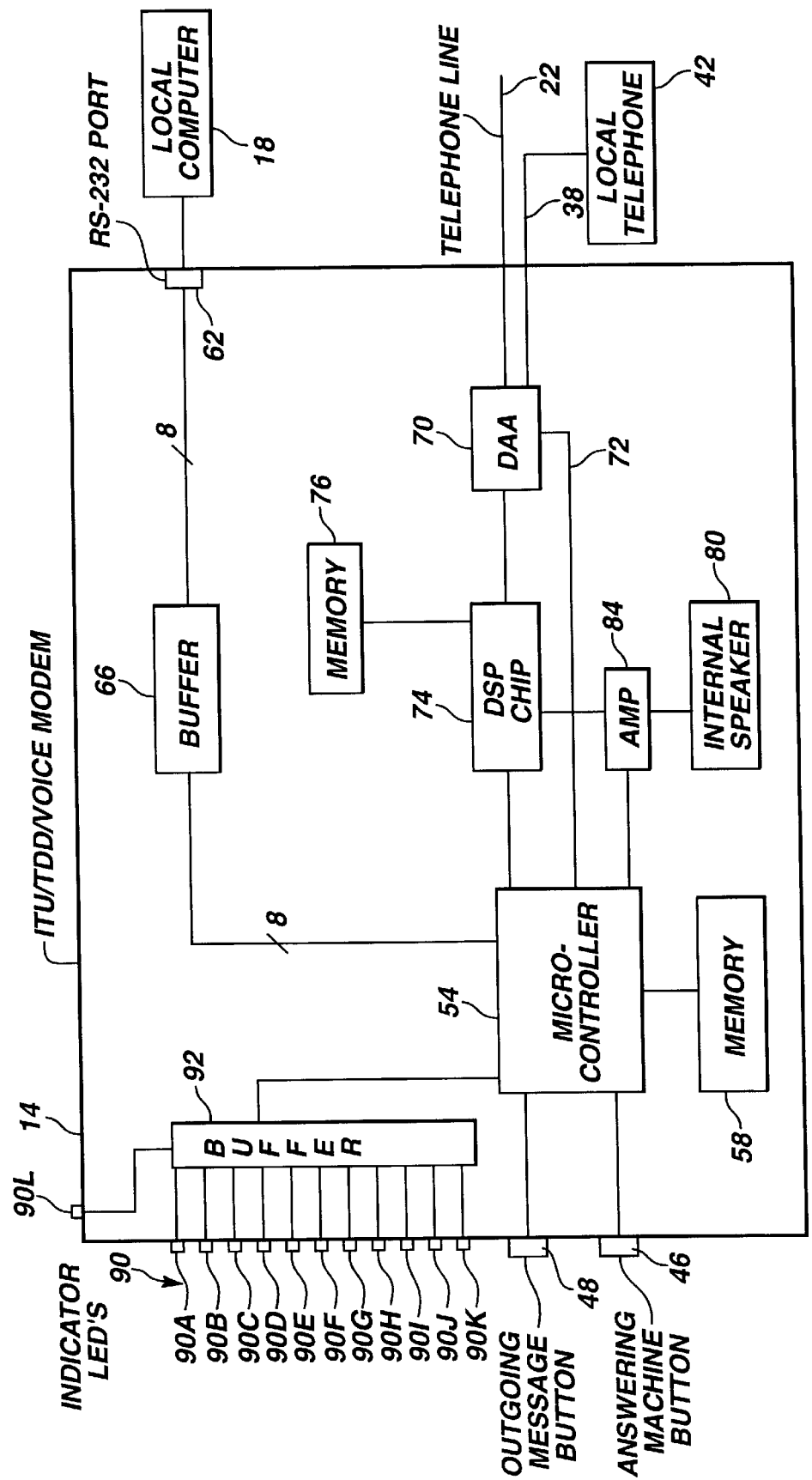
FIG. 2 is a more detailed schematic block diagram representation of a preferred embodiment of the ITU/TDD/VOICE modem of FIG. 1.

Referring to FIG. 2, a preferred embodiment of ITU/TDD/VOICE modem 14 is shown in more detail. ITU/TDD/VOICE modem 14 includes a micro-controller 54 and memory 58. Memory 58 typically contains at least two prestored messages, one for prestored outgoing message mode and one for answering machine mode. (It is possible, but unlikely, that the messages for prestored outgoing message mode and answering machine mode would be identical). The messages may have been prestored by the manufacturer or someone else other than the user, or may be created and stored by the user through, for example, local computer 18. In that case, the user will typically type the desired prestored outgoing message and/or the answering machine mode greeting on the keyboard of local computer 18 and transmit this text to the memory 58 of ITU/TDD/VOICE modem 14 for storage. (The message may even be changed remotely.) One or more prestored voice message may also be contained in memory 58.

Means of entering voice signals include recording through telephone line 22; local telephone 42; a microphone via sound card 110; a microphone via audio-in 102 (see FIG. 3); or sound card 110 through RS-232 port 62. Voice signals may be synthesized in sound card 110, DSP chip 74, or local computer 18.

ITU/TDD/VOICE modem 14 includes a separate DSP chip 74 with its associated memory 76, which may be internal to or external to DSP chip 74. Voice signals may be stored in memory 58 and/or memory 76. DSP chip 74 typically provides the ITU modem functions and audio processing for voice functions. The TDD modem functions may be supported by either DSP chip 74 or microcontroller 54.

Local computer 18 is connected to microcontroller 54 through a EIA-TIA 232 port (formerly called "RS-232" and also known as a V.24 port) 62 and a buffer 66. The port 62 will be called an "RS-232" port herein. Alternatively, the ITU/TDD/VOICE modem 14 may be a plug-in card internal to local computer 18, or the functionality of modem 14 may be incorporated in the circuitry of local computer 18.

Telephone line 22 is connected to micro-controller 54 through data access arrangement circuit (DAA) 70 and modem chip 74. Line 72 is a digital ring indicator line. A codec (ADC and DAC) is included in DSP chip 74 or between DSP chip 74 and DAA 70, for processing signals to and from DAA 70.

ITU/TDD/VOICE modem 14 may include an internal speaker 80, which is connected to micro-controller 54 and/or modem chip 74 through an amplifier 84. When an incoming call is received, telephone 42 (if present) is connected to line 22 through DAA 70 and will ring to signal an incoming call. Alternatively, or in addition, internal speaker 80 will transmit audible sounds. The presence of an incoming call may be indicated through a variety of other means including a separate telephone or some other signalling device (using light, vibration, or sounds).

ITU/TDD/VOICE modem 14 may provide call progress monitoring messages (e.g., busy, ringback, ringing, carrier status, dial tone, etc.) to the screen of local computer 18. ITU/TDD/VOICE modem 14 may also provide a visual indication of sound energy on telephone line 22 to the screen of local computer 18. This last function would be most useful in the internal card version of ITU/TDD/VOICE modem 14 to replace the function of the external indicator LED 90C, described below.

ITU/TDD/VOICE modem 14 may include various indicator lights 90 that are activated through a buffer 92. For example, one embodiment of ITU/TDD/VOICE modem 14 includes light emitting diodes (LEDs) 90A–90K that provide the following information.

LED 90A monitors RS-232 port 62 and indicates that signals are being transmitted from local computer 18 to ITU/TDD/VOICE modem 14. LED 90A may be referred to as an "Outs" or "TX" light.

LED 90B monitors RS-232 port 62 and indicates that signals are being transmitted from ITU/TDD/VOICE modem 14 to local computer 18. LED 90B may be referred to as an "In" or "RX" light.

LED 90C indicates that sound signals which exceed a certain amplitude threshold are on telephone line 22. The ITU/TDD/VOICE modem 14 may include a programmable amplitude threshold which governs the activation of the LED 90C. LED 90C gives a deaf user information about the remote call. For example, a ringing or busy signal will generally cause the light to flash with a distinctive cadence. Voice signals generally cause LED 90C to flash irregularly.

LED 90D indicates that ITU/TDD/VOICE modem 14 is receiving power.

LED 90E indicates that ITU/TDD/VOICE modem 14 will automatically answer line 22, and may be referred to as an "AA" light.

LED 90F indicates ITU/TDD/VOICE modem 14 is connected to telephone line 22, and may be referred to as an "OH" or "off hook" light.

LED 90G indicates ITU/TDD/VOICE modem 14 is in an autodetect mode and will discriminate between TDD and ITU formats in answering or calling mode.

LED 90H (if LED 90G is off) indicates that the ITU/TDD/VOICE modem 14 has been set to operate as a TDD.

LED 90I (if LED 90G is off) indicates that the ITU/TDD/VOICE modem 14 has been set to operate as an ITU modem.

If LED 90G and LED 90H are on, ITU/TDD/VOICE modem 14 is in autodetect mode, and the active call is in TDD mode.

If LED 90G and LED 90I are on, ITU/TDD/VOICE modem 14 is in autodetect mode, and the active call is in ITU mode.

LED 90J indicates ITU/TDD/VOICE modem 14 is in answering machine mode.

LED 90K indicates a data message has been received and stored in memory, such as memory 58.

LED 90L indicates a voice message has been received and stored in memory, such as memory 76.

As used herein, a telephone call includes any signal over telephone line 22, whether originating from a telephone (voice call), an ITU/TDD/VOICE modem, a TDD, a standard modem, a facsimile machine, or other remote device. The present invention may be employed in connection with a private branch exchange (PBX) system, in which case telephone line 22 might not be part of the PSTN.

ITU/TDD/VOICE modem 14 may include an "ITU/TDD autodetection" feature that determines whether signals are in Baudot or an ITU or similar format. When ITU/TDD/VOICE modem 14 originates a call over the PSTN, ITU/TDD/VOICE modem 14 goes off-hook, dials the outgoing call, sets its detectors to "listen" for TDD Baudot frequencies as well as ITU modem answer tones, and then connects appropriately according to the signals received. When an incoming call is received by ITU/TDD/VOICE modem 14 through line 22, ITU/TDD/VOICE modem 14 first answers the call by going off-hook and then transmits an ITU answer tone for a few seconds. If a calling ITU modem responds, the ITU "handshake" or call negotiation process is begun and the connection established. If no ITU calling modem response is elicited, ITU/TDD/VOICE modem 14 may transmit in TDD Baudot format to attempt TDD communications with the caller.

ITU/TDD/VOICE modem 14, while transmitting an ITU answer tone may simultaneously set its detectors to listen for Baudot TDD signals. If the remote caller is using a TDD and transmits TDD characters, ITU/TDD/VOICE modem 14 may immediately abort the ITU answer tones and switch to TDD mode.

Alternatively, with an incoming call, ITU/TDD/VOICE modem 14 may go off hook and first transmit Baudot TDD characters to elicit a response from a TDD caller. This attempt could be followed by the ITU answer tone, if necessary, to attempt connection with an ITU modem.

ITU/TDD/VOICE modem 14 can add the detection of voice to the above "ITU/TDD autodetection" procedure to create an "ITU/TDD/VOICE autodetection" procedure. In call originate mode, after dialing the phone number, ITU/TDD/VOICE modem 14 can set its detectors to listen for either an ITU answer tone, TDD tones, or voice signals and connect accordingly.

In call answer mode, ITU/TDD/VOICE modem 14 can operate as follows during the ITU/TDD/VOICE autodetection procedure.

In a preferred embodiment, ITU/TDD/VOICE modem 14 will first transmit a voice message such as "This is ABC Agency. If you have a touch tone phone please press one now . . . ." If a DTMF "1" is received by ITU/TDD/VOICE modem 14 then the call is determined to be a voice call and ITU/TDD/VOICE modem 14 can proceed as a voice answering machine or information retrieval system. However, if a DTMF "1" is not received, then ITU/TDD/VOICE modem 14 can proceed to enter the ITU/TDD autodetection mode described above so as to ascertain whether the call is from an ITU or TDD modem.

Alternatively, if the DTMF "1" is not received, ITU/TDD/VOICE modem 14 can transfer or cause to transfer the call to a human operator, or otherwise signal a human operator to attempt to talk to the caller. The human operator will typically ascertain if the caller is a voice caller not using a touch tone phone. If no voice response is elicited by the human operator, then the human operator can cause ITU/TDD/VOICE modem 14 to enter the ITU/TDD autodetection mode described above and attempt an ITU or TDD connection with the caller.

Alternatively, the initial voice message can request that the caller speak. A typical initial voice message might be "This is ABC Agency. If you wish to use our automated voice system please say "YES now." ITU/TDD/VOICE modem 14 will now listen for voice signals on the telephone line 22, and if received will proceed as a voice system. If no voice response is received then ITU/TDD/VOICE modem 14 will enter the ITU/TDD autodetection mode and attempt to connect with an ITU or TDD caller.

The order of the steps explained above may be varied. For example, ITU/TDD/VOICE modem 14 may first enter the ITU/TDD autodetection procedure, and if an ITU or TDD connection is not successful then transmit a voice message to attempt to elicit a response from a voice caller.

Further, the addition of facsimile detection is easily added to the above ITU/TDD autodetection or the ITU/TDD/VOICE autodetection procedures. For example, in call answer mode, ITU/TDD/VOICE modem 14 can, after going off hook, also listen for calling tones from a facsimile machine. Similarly, in call originate mode ITU/TDD/VOICE modem 14 can listen for facsimile answering tones, in addition to listening for ITU modem, TDD, and/or voice signals.

It is noted that ITU/TDD/VOICE modem 14 could be internal (e.g., as a card) to a local computer (similar to local computer 18) or built into the circuitry of local computer 18. In either case, the local user could operate other software (e.g., word processing software) while ITU/TDD/VOICE modem 14 operated in stand alone mode. Answering machine button 46 and outgoing message button 48 could be external to the local computer and connected to the card through a cable or mounted on the back of the card.

The following are additional features that may be performed by ITU/TDD/VOICE modem 14. It is noted that various embodiments of ITU/TDD/VOICE modem 14 may include some, but not others of the features.

1. Answering machine mode

The ITU/TDD/VOICE modem 14 may be set in stand alone answering machine mode by various means. (As explained below, answering machine mode may include a query-driven information retrieval system mode.) A preferred implementation allows this process to be initiated by either activating answering machine button 46 on ITU/TDD/VOICE modem 14, or by sending a software command from local computer 18 to ITU/TDD/VOICE modem 14. The button may be replaced with any type of sensor or remote actuation technique.

An incoming call to ITU/TDD/VOICE modem 14 will cause the telephone line 22 to "ring." ITU/TDD/VOICE modem 14 can answer the call after a specified number of rings. The number of rings before answering may be specified by the local user and transmitted to the memory of modem 14, or may be set by the manufacturer or others.

Once the ITU/TDD/VOICE modem 14 is set to stand alone answering machine mode, the operation may be as follows:

a. After detecting the "ringing" of an incoming call, and waiting the specified number of rings to answer, ITU/TDD/VOICE modem 14 will answer by "going off hook" and connecting to phone line 22.

b. ITU/TDD/VOICE modem 14 enters the "ITU/TDD autodetect", negotiates whether the call is from an ITU or TDD device, or enters the "ITU/TDD/VOICE autodetect" and negotiates whether the call is from an ITU or TDD device or a voice caller. Facsimile calls will announce themselves through their signals and may also be detected.

c. ITU/TDD/VOICE modem 14 sends the prestored answering machine greeting or other message in the appropriate format (ITU, TDD, or voice). This message can tell the caller to leave a message. In this case, ITU/TDD/VOICE modem 14 will record the caller's ITU, TDD, or voice message in memory. Facsimile messages may also be stored.

Alternatively, ITU/TDD/VOICE modem 14 can just transmit pre-stored information to the caller and then proceed to hang up. Alternatively, ITU/TDD/VOICE modem 14 can transmit choices or queries to the caller and allow the caller to choose among various options. These could include choosing among various information request options. For example, if the incoming call is determined to be a voice call through the detection of DTMF tones or voice signals on the line as explained in the "ITU/TDD/VOICE autodetection" procedure above, ITU/TDD/VOICE modem 14 can present the options or choices in voice mode and respond accordingly to the caller's requests. If the call is an ITU or TDD call then ITU/TDD/VOICE modem 14 might transmit "For information on A type 'CHOICE 1', for information on B type 'CHOICE 2'." If the caller types 'CHOICE 1' or 'CHOICE 2' on their TDD keyboard or the remote ITU modem/computer keyboard, then modem 14 will take appropriate action or transmit the prerecorded information corresponding to the users request(s). The preferred implementation will request the caller to enter his or her choices from their TDD or ITU modem/computer keyboard and not from the telephone keypad. The intent may be to provide the same information, call routing options, or other choices to the TDD or ITU modem caller as is available to the voice caller.

Additional options which may be offered to the caller include:

1) An option to signal the local user to sign on to the calls. In this case, ITU/TDD/VOICE modem 14 can create sounds through internal speaker 80 to signal the local user to activate local computer 19 and the communications software so as to transmit and receive text with the caller in the ITU or TDD format of the present call. The signalling of this request to the local user can be accomplished through other means such as flashing lights, vibration, and so on. It is noted that this option does not depend on local computer 18 being on or active relative to ITU/TDD/VOICE modem 14.

2) An option to leave a message that will be stored in memory 56 or 76 as explained above, in addition to any other requests.

Once the caller's message has been received, ITU/TDD/VOICE modem 14 hangs up and disconnects the call and is ready to answer the next call. LSD 90K, or other signalling device, is activated to alert the local user that a caller's data message has been stored in internal modem memory 58. The user may then use local computer 18 to download the stored message(s) from ITU/TDD/VOICE modem 14 to view or print the caller's messages from local computer 18.

Alternatively, in stand alone answering machine mode, local computer 18 may be on and the local user may be monitoring the incoming text on the display of local computer 18. The user may elect to take over the call and type to the remote user by pressing answer machine button 46 to turn off answering machine mode or by sending a software command from local computer 18 to ITU/TDD/VOICE modem 14.

The software of ITU/TDD/VOICE modem 14 may be such as to automatically initiate downloading of a stored message to memory of local computer 18 when and if the communications software of local computer 18 is active with respect to ITU/TDD/VOICE modem 14. An advantage of this procedure is that it may reduce the amount of memory needed in memory 58 or increase capacity for storing messages.

Note that local computer 18 may include answering machine software and act as an answering machine in conjunction with ITU/TDD/VOICE modem 14 during computer communicating mode. In this case ITU, TDD, and/or voice messages could be stored in local computer 18 memory, and outgoing text or voice messages also could be stored in local computer 18 memory.

2. Prestored outgoing message mode

When outgoing message button 48 is activated by the user, ITU/TDD/VOICE modem 14 answers the call by going off book and enters the ITU/TDD or the ITU/TDD/VOICE autodetection mode described earlier. The user can specify (through, for example, local computer 18) that ITU/TDD/VOICE modem 14 attempt connection with, for example, (a) only ITU or TDD modems, (b) ITU modems, TDDs, or voice callers, (c) ITU modems or voice callers, (d) only ITU modems, or, (e) TDD's or voice callers using the procedures described earlier. The local user typically actuates outgoing message button 48 in response to an active incoming call on telephone line 22.

Once ITU/TDD/VOICE modem 14 negotiates ITU, TDD, or voice connection with the remote caller, a prestored message in memory 58 or memory 76 is then transmitted over telephone line 22 to the remote device in the appropriate ITU, TDD, or voice format. The message could say something to the effect that "This is John Smith. Please wait and I will be right with you." Local computer 11 may be off or loaded with the appropriate software during the time of the aforementioned operation. In the preferred embodiment, the message is a data message rather then a voice message. In essence, that message is intended to let the remote user know that the computer of the local user will soon be available for communication, Of course, various other messages may be prestored.

Advantages of outgoing message mode are as follows. Most callers expect a fast response to their call. Silence lasting more than 5 or 10 seconds after the ringback signal has ended will lead many callers to conclude that their call did not go through or was not answered. This is not usually a problem for TDD calls if the answering party uses a traditional TDD since a user can turn on a traditional TDD and begin typing almost immediately. A "traditional TDD" is an independent stand alone unit with a small one or two line display area integral keyboard. These devices are not general purpose computers like local is computer is and generally support only TDD or TDD/ITU modem functions, and not other functions like word processing or spreadsheets. The general purpose local computer 18, on the other hand, can take significant time (20 seconds or more) to initialize after power is turned on, and the communications software necessary to allow operation with a modem will take additional time to load or activate after that. Users who expect data calls and wish to use a modem in conjunction with local computer 18 have traditionally left their computer on and the communications software active in order to provide a quick response to callers. A telephone line 22 is often dedicated exclusively to modem calls if such calls are expected.

Outgoing message mode allows a fast response to be provided to a standard modem or TDD caller, even if local computer 18 is off. This means that local computer 18 does not need to be dedicated to modem support, and the phone line can be conveniently shared between data calls and voice calls.

Outgoing message mode also provides a convenient way to automatically send a standard greeting in the correct format which the local user need not type manually.

In the following scenario, a user is present and the phone rings. If he is a hearing person, he can pick up the phone and says hello. If he hears a voice, he begins speaking. If he hears fax tones, he knows its a fax. If he hears nothing, he may assume it is an ITU modem or TDD modem call. Note: sometimes a TDD caller will type keys to quake a recognizable TDD modulation sound. Similarly, certain ITU modem standards support "calling tones" that can alert a person answering the call that the call is an ITU modem call.

If local computer 18 is not ready to communicate is (or even if it is), a hearing or deaf user can press outgoing message button 48 which causes ITU/TDD/VOICE modem 14 to enter the ITU/TDD or ITU/TDD/VOICE autodetection procedure described above. In any case, an ITU modem caller or a TDD caller receives the user programmed outgoing message quickly and is assured that their call has been answered. This provides time for the local user to turn on local computer 18 if necessary and/or activate the communications software if necessary and begin typing to the caller. This technique provides that neither local computer 18 nor telephone line 22 need be dedicated exclusively to data calls.

Figure 5:
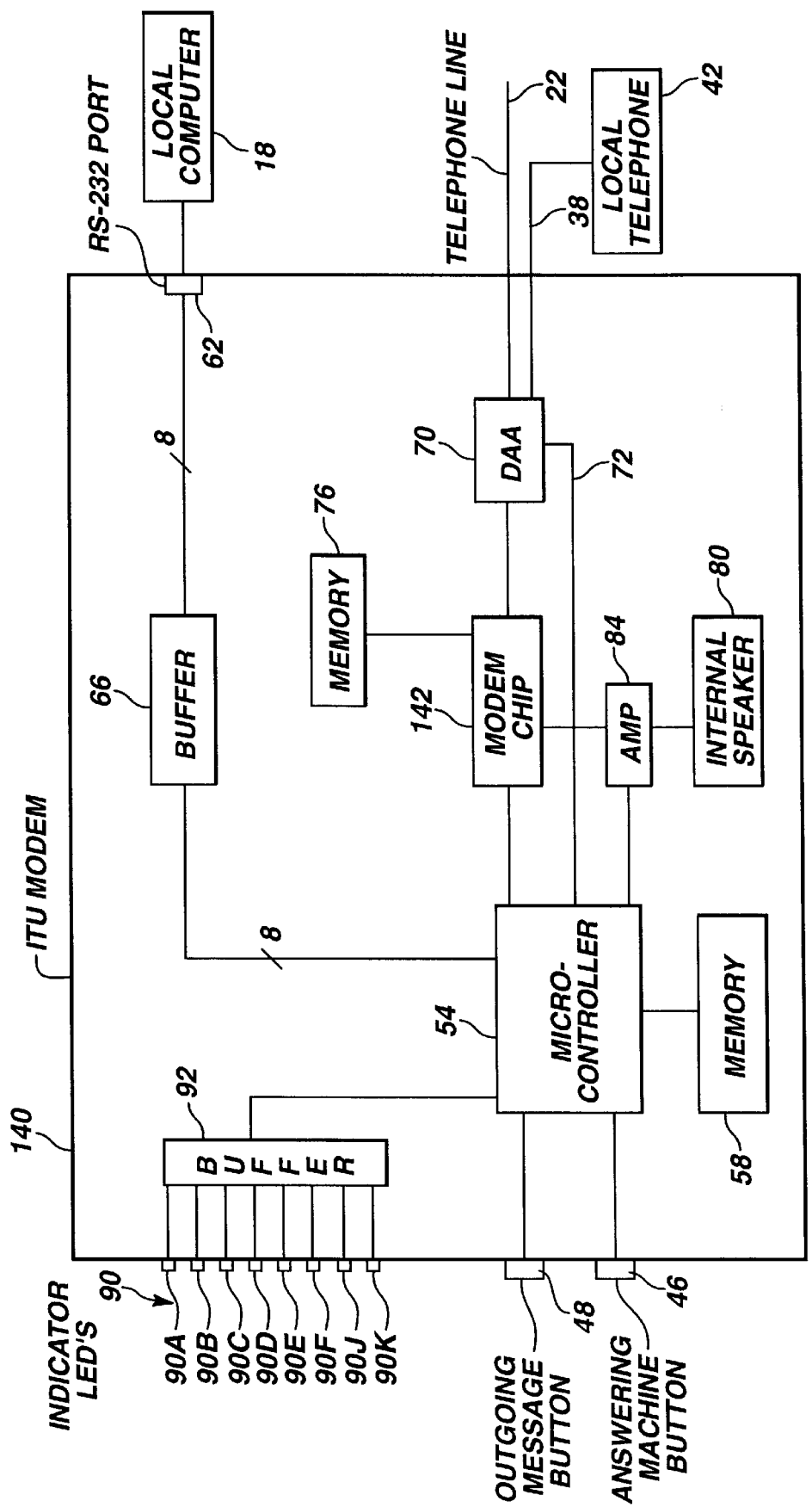
FIG. 5 is a schematic block diagram representation of an ITU modem according to the present invention.

It is noted that if the user expects only ITU modem calls, or only voice and ITU modem calls, or only ITU modem, fax, and/or voice calls, then activation of prestored outgoing message mode can provide the advantages explained above. Referring to FIG. 5, local ITU modem 140 may be capable of only ITU modem or ITU modem and fax communications. If a call comes in and the local user answers, says "hello" or etc., and hears either silence or ITU modem or fax calling tones, the user may elect to actuate outgoing message button 48. This will cause ITU modem 140 to answer the call and negotiate a connection with an ITU modem caller and send the prestored outgoing message so as to provide a fast answer response to the ITU modem caller. This provides time for the local user to turn on or otherwise activate the communications software running on local computer 18 to sign on with the ITU modem caller. If the incoming call is from a facsimile machine then the actuation of outgoing message button 48 will cause ITU modem 140 to answer the call, switch to fax mode, and receive the incoming fax, again independently of whether local computer 18 is on or not.

3. Transmit/Receive LED's in TDD Mode

Most standard external ITU modems which connect to the RS-232 port of a PC type computer have indicator lights, similar to LEDs 90A and 90B, which show activity an the RS-232 transmit and receive lines. These lights are sometimes labelled "TX" and "RX" and provide visual information to the user regarding information transfer between the local modem and the local computer.

In a preferred embodiment of the invention, while ITU/TDD/VOICE modem 14 is not connected with a caller, or is transmitting or receiving data in ITU format, ITU/TDD/VOICE modem 14 controls LEDs 90A and 90B in the conventional manner and flicker to show information transfer between local computer 18 and ITU/TDD/VOICE modem 14.

However, in a preferred embodiment of the invention, while ITU/TDD/VOICE modem 14 is transmitting or receiving data in TDD format, ITU/TDD/VOICE modem 14 controls LEDs 90A and 90B in a different manner. Instead of blinking in response to information transfer activity between ITU/TDD/VOICE modem 14 and local computer 18, LEDs 90A and 90B blink in response to information transfer between ITU/TDD/VOICE modem 14 and remote TDD 26. As each TDD character is transmitted to remote TDD 26, the "TX" LED 90A blinks once or in a distinctive way. As each TDD character is received from remote TDD 26, "RX" LED 90B blinks once or in a distinctive way.

One utility of this arrangement is due to the fact that the TDD protocol is very slow (45.45 baud in the United States) and it is easy for a fast typist to type ahead of the actual transmission to remote TDD 26. A fast typist might finish typing to the remote user and think that the remote user was delaying their response, when in fact the typed characters were still being transmitted. The present innovation allows the local user to look at LED 90A and visually verify when the transmission of their typed characters is completed.

This advantage could also be accomplished using the display of local computer 18, so that as each TDD character is transmitted or received a visual indication is made on the screen of local computer 18.

In a preferred embodiment of ITU/TDD/VOICE modem 14, LEDs 90A and 90B are operated differently from the traditional manner only during TDD mode, not during ITU mode.

4. Reacquisition mode from TDD mode

In the past, ITU modems have not generally allowed modem calls to be placed on hold and transferred to another phone extension. The constant "carrier" present in ITU modem operation will be lost or "dropped" if a call is placed on hold so that the local and remote modems are typically disconnected. Some ITU modems can be set so as to allow a reconnection with the original modem, but ITU modems cannot reconnect with a different modem, except by re-dialling the phone so as to enter the protocol "handshake" sequence with the new remote modem and reconnect.

In June 1994, a new ITU standard called "V.18" was approved. ITU standard V.18 addresses some of the shortcomings described above. On loss of carrier, a V.18 modem will go back into a mode essentially identical to when the modem has dialed the call (originate mode) and is waiting for an answering ITU or TDD modem to respond. This state is referred to herein as "reacquisition mode." This allows a call from a V.18 modem to be put on hold, transferred to another extension, and reconnect with another ITU modem.

ITU/TDD/VOICE modem 14 may include a feature in addition to that of the V.18 standard. The V.18 standard specifies that a V.18 compliant modem will enter reacquire mode if an ITU modem carrier signal is lost. It does not address entering reacquire mode from a TDD connection. ITU/TDD/VOICE modem 14 allows the user to select reacquire mode during a TDD connection. The utility of this innovation comes about when the local user has made a TDD connection with a remote user, and the remote user types that he or she is going to put the call on hold and transfer to another remote user. At this point, the local user of ITU/TDD/VOICE modem 14 can select "reacquisition mode." Now, the new remote user can answer with an ITU standard modem or a TDD and connect with ITU/TDD/VOICE modem 14. In the case of calls in TDD format, the communications software for operating ITU/TDD/VOICE modem 14 may include an icon labelled "Reacquire." The local user may activate the "Reacquire" icon upon being told his call will be transferred to another extension.

Alternatively, ITU/TDD/VOICE modem 14 can set its detectors to listen continuously for ITU answering tones during a call in TDD format. If the TDD call is placed on hold and transferred to another extension by the remote user, ITU/TDD/VOICE modem 14 could establish a connection with a new remote ITU modem or TDD modem automatically without any action on the part of the local user.

5. Minimizing answer tone duration

ITU modems answer a call and emit an ITU "answer tone." The length of this tone is usually set by a user modifiable register, typically the register S7. If register S7 times out, an ITU modem will abort the call and hang-up, even if the two modems are in the middle of a handshake. This is not a problem for ITU modems, because ITU modems will typically set the S7 register to a long period (e.g., 30, 45, or 60 seconds) so this timeout will not usually happen during the handshake.

Setting the S7 timeout to a long interval is not desirable for an ITU/TDD/VOICE modem. An answering ITU/TDD/VOICE modem, in "ITU/TDD autodetect" mode, may first emit the ITU answer tone and (if no response is detected), when S7 times out will switch over and emit Baudot. Since the TDD caller is waiting for a response, it is desirable to make the ITU answer tone as short as possible with a small S7 interval. This, however, makes it more likely that the S7 time will elapse in the middle of an ITU handshake.

To address this problem, ITU/TDD/VOICE modem 14 does the following. After it begins to emit the ITU answer tone, ITU/TDD/VOICE modem 14 monitors for any signal coming back from a remote ITU modem. If a valid ITU signal is detected, ITU/TDD/VOICE modem 14 extends the register S7 time. This technique allows ITU/TDD/VOICE modem 14 to have a substantially shorter ITU answer tone in the case where the remote device is a TDD, but still be able to connect with most remote ITU modems. A modem not using this technique would extend the S7 time enough so that it does not time out during the ITU handshake. However, in the case of ITU/TDD/VOICE modem 14, the S7 time need be only as long as it takes for the originating modem to begin its first response. This reduces the duration of the answer tone in ITU/TDD/VOICE modem 14 by several crucial seconds.

A second innovation of ITU/TDD/VOICE modem 14 in the ITU answer tone area is that it provides software control as to whether the V.25 2100 tone is sounded prior to the ITU answer tone set by the modulation standard in use. The V.25 tone adds 2 to 4 seconds to the answering sequence and so is undesirable for a fast answer response to a TDD caller. The 2100 Hz. V.25 tone turns off the echo suppressor on the telephone line which are part of the PSTN. It is not generally needed for domestic calls within the U.S. and is generally needed only for international calls.

Two points may be made here. First, some "European style" modems may require a V.25 2100 Hz. tone (usually about 3 seconds worth) which prefaces the true ITU modulation "answer tone." Unfortunately, this tone adds to the delay before Baudot can be sent. ITU/TDD/VOICE modem 14 lets the communications software enable or disable the V.25 tone as needed. Secondly, ITU/TDD/VOICE modem 14, as mentioned above, is actively listening for Baudot tones during the V.25 and ITU answer tone period, so if the TDD caller is tapping the space bar or typing other characters he can get an immediate Baudot response.

6. ITU/TDD/VOICE modem status Query

Many conventional ITU modems use some variation of the "Hayes" command set. Such modems provide status information to the local computer by responding to "ATSxx?" commands from the "AT command model" of the modem, where xx is the number of a particular "S" register. Therefore, status information of the modem (including whether the modem is connected with a remote device, which ITU modulation standard is in effect, and other parameters) can be queried by the local computer by sending the "ATSxx?" query. If a conventional ITU modem is connected with a remote ITU modem, the conventional ITU modem will not respond to the "ATSxx?" command if the modem is not in AT command mode. During an active ITU connection, and if the modem is not in AT command mode, the local computer can query the status of a conventional ITU modem by first issuing an "escape sequence" of three characters, often "+++". This escape sequence may be bracketed with a time delay before and after the characters, sometimes called the "escape code guard time." The conventional ITU modem will then enter an "on-line AT command mode", and will then respond to "ATSxx?" queries as to its status.

As described herein, ITU/TDD/VOICE modem 14 may operated in a stand alone mode. When the communications software on local computer 18 becomes active with respect to modem 14, modem 14 may or may not have an active ITU or TDD connection. The conventional system of querying modem status is inadequate for the present invention for the following reasons. First, the "ATSxx?" query is ineffective since important modem status information is typically scattered in many different "S registers" in a conventional ITU modem and multiple "ATSxx? queries would need to be sent. Second, the conventional process of entering AT command mode from a connect state may be slow if an "escape code guard time" is used. Third, the escape characters "+++" or etc. will normally be sent to the remote ITU or TDD modem if a connection is present, which is undesirable. Fourth, the speed of the RS-232 link between the local computer and the local modem normally (but not necessarily) matches the speed of the link between the local modem and the remote modem. Since the local modem may have negotiated a connection with a remote modem in stand alone mode, local computer 18 has no way to know the speed of the RS-232 connection to make the "ATSxx? status request. Any "AT" command, if sent at the wrong baud rate, will not be seen by the local modem at all.

The ITU/TDD/VOICE modem 14 solves these problems as follows. ITU/TDD/VOICE modem 14 responds to a new type of "status query" with a "status packet" summarizing the important modem status information. This status packet will contain more information than is found in any one S register of a conventional ITU modem. Typical information bundled in the status packet transmitted from modem 14 may include some, but not necessarily all, of the following: (1) connection present yes/no, (2) type of connection if present (ITU, TDD, VOICE), (3) ITU/TDD/VOICE/ AUTODETECT modem mode, (4) speed or the ITU connection if present, (5) stand alone answering machine mode on/off, (6) current answering machine call yes/no, (7) type of active answering machine call if present (ITU or TDD) and speed, (8) whether a message has been received and stored, and (9) other information of interest.

In the preferred implementation, local computer 18 can query the status of ITU/TDD/VOICE modem 14 via a hardware signal, namely by toggling the "DTR" line of the RS-232 connection between ITU/TDD/VOICE modem 14 and local computer 18. The ITU/TDD/VOICE modem 14 will respond to this signal by sending the status packet described above at a predetermined speed (e.g., 2400 bps), regardless of the presence or absence of a connection and regardless of the speed of the connection if present. In this way, local computer 18 can match the speed of the RS-232 connection maintained by ITU/TDD/VOICE modem 14 as well as synchronize with all other important modem states.

The status packet described above can be queried for in other ways. For instance, special characters could be sent to modem 14 and interpreted as a request to send the status packet just described. This technique has the same potential problem as the conventional technique described above: the special characters should not be interpreted as a status request if they happen to show up in a binary file transfer.

The conventional "escape code guard tire" technique could be used to solve this problem, but again at the cost of slowing the speed with which local computer 18 can ascertain the status of ITU/TDD/VOICE modem 14. Preferably, the special characters would not be transmitted to the remote device.

Alternatively, modem 14 could be placed explicitly in a "file transfer" or "non file transfer" mode (through, for example, AT commands sent during AT command mode). Since file transfer will typically be performed only under the control of local computer 18, the default state could be "non file transfer" mode and special characters can be defined as status request characters, which result in the transmission of the status packet described above being sent from ITU/TDD/VOICE modem 14 to local computer 18. These special characters can result in an immediate response from modem 14, yet can still be sent in a binary file transfer once ITU/TDD/VOICE modem 14 is explicitly placed in a file transfer mode. In "file transfer" mode, ITU/TDD/VOICE modem 14 could ignore these special characters. Once in file transfer mode, ITU/TDD/VOICE modem 14 could wait until data was transmitted on telephone line 22 followed by some seconds of non-transmission, and could then automatically return to AT command mode. This last "software" technique has the possible disadvantage that the local PC will not necessarily know the speed of the RS-232 modem 14 to local computer 18 link if ITU/TDD/VOICE modem 14 negotiates this connection independently of local computer 18. In this case, a fixed RS-232 speed should be maintained between ITU/TDD/VOICE modem 14 and local computer 18, a technique sometimes called "speed buffering."

The hardware technique of querying the modem status described above can of course be accomplished by toggling RS-232 lines other than DTR, or by different combinations of toggles or levels of the lines linking ITU/TDD/VOICE modem 14 and local computer 18, or by software commands sent in conjunction with certain combinations of toggles or levels of the lines linking the modem and the PC.

This techniques could be useful even if used for querying individual S registers rather than a status packet.

7. Silencing the Baudot or ITU modulation sounds for a Hearing Party

In some cases, one or both persons on the telephone call can speak or hear, but not both. A person who can talk but not hear may wish to speak but receive TDD or ITU mode ASCII characters from the remote party. This is sometimes called "voice carry over" (VCO). A person who can hear but is speech impaired may wish to type TDD or ASCII characters to the remote party, but listen to the voice response from the remote party. This is sometimes called "hearing carry over" (HCO). The problem is that in both cases, the hearing party will hear the noisy and irritating tones of the Baudot or ITU transmission when the TDD or ASCII characters are sent. To solve this problem, ITU/TDD/VOICE modem 14 provides flexible software control of the phone connection to local telephone 42. It is assumed here that the local user will connect the local telephone 42 to the ITU/TDD/VOICE modem "PHONE" connector 38.

Case 1: Speaking but deaf person communicating with a local hearing/speaking person (VCO). When the local hearing party begins transmitting TDD or ASCII characters (or other formats), ITU/TDD/VOICE modem 14 can automatically disconnect the local telephone 42 from phone line 22 before sending the first typed character and so shut off the sound to the local hearing party. When the hearing party finishes typing, he pushes a keyboard button that sends a software command that tells modem 14 to reconnect the local telephone 42 to the phone line 22 and so resume sounds to the hearing party. Modem 14 could also automatically reconnect the local telephone 42 in response to incoming voice signals from the remote location.

Case 2: Hearing but speech impaired person communicating with a local hearing/speaking person (HCO). When the hearing/speaking person is done speaking, he does not want to hear Baudot or ITU sounds, so he may press a keyboard button (or otherwise provide a command) to disconnect local telephone 42 from phone line 22 and so shut off sounds. Once the remote party has finished typing and the local hearing party wishes to begin speaking again, he can reconnect local telephone 42 to telephone line 22 with a keyboard button command or other means. ITU/TDD/VOICE 14 could detect voice signals from the local speaker and automatically reconnect local telephone 42 to telephone line 22, and detect TDD signals from the remote party to disconnect local telephone 42.

Other combinations of hearing/deaf, speaking/speech impaired, local/remote users will be apparent.

These techniques will also work with any ITU modem that allows the carrier to stop during the voice transmission half of the transmission. As described above, an ITU capable modem can disconnect local telephone 42 from phone line 22 during ITU transmission of characters or data so that the local party need not listen to the modem modulation sounds, and reconnect the local telephone 42 to enable the hearing party to listen to the voice on the line.

8. Audio in and audio out Connectors

Figure 3:
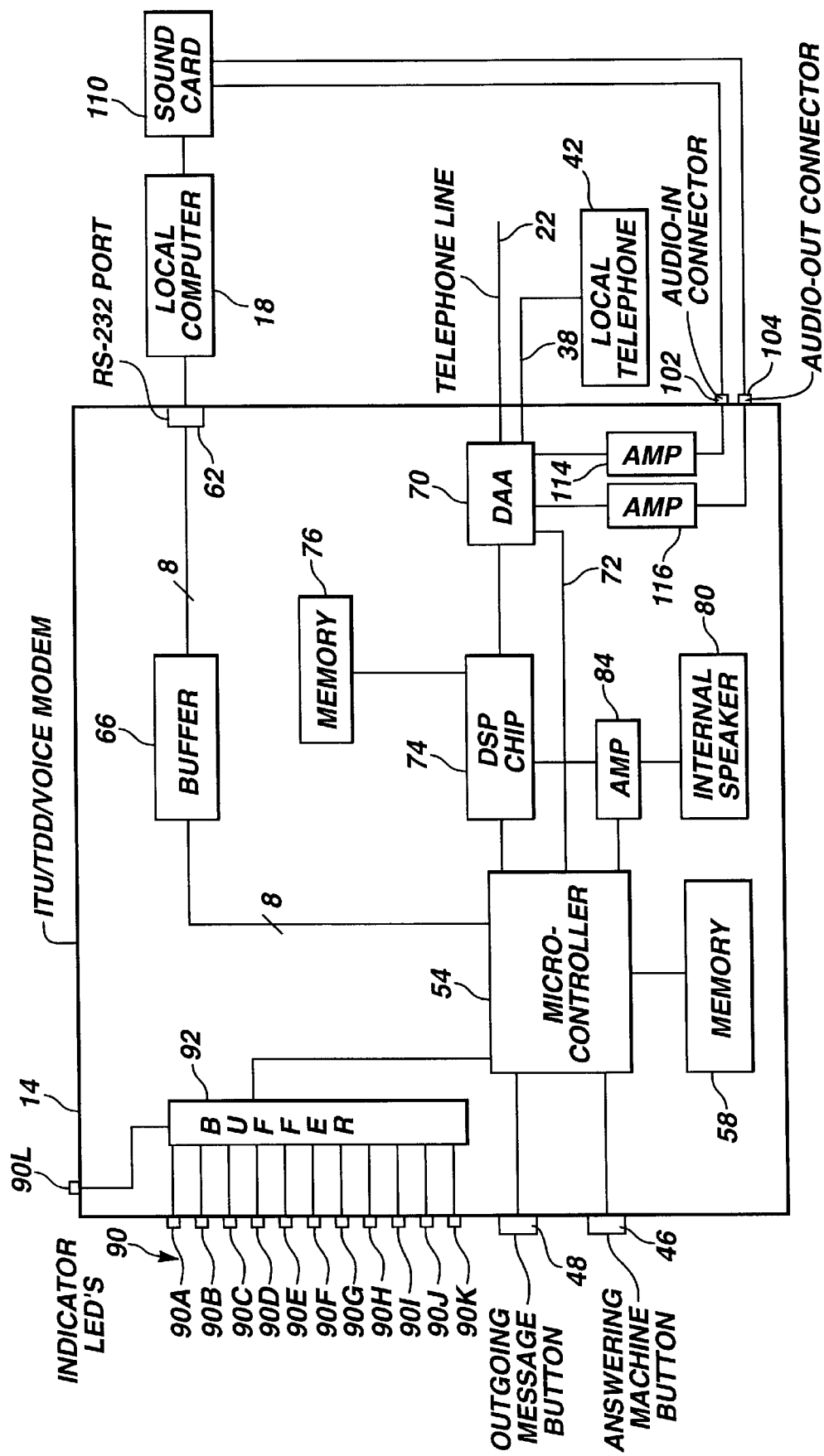
FIG. 3 is a schematic block diagram representation of FIG. 2 with additional audio-in and audio-out connectors.

FIG. 3 shows ITU/TDD/VOICE modem 14 as in FIG. 2, but with additional audio-in connector 102 and audio-out connector 104 and a sound card 110. Sound card 110 may be included in micro-controller 54. Audio-in connector 102 and audio-out connector 104 may be connected to DAA 70 through amplifiers 114 and 116.

Audio-in connector 102 and audio-out connector 104 may perform two functions. First, audio-in connector 102 and audio-out connector 104 may facilitate a substitute for local telephone 42. In this case, the audio-out may be selectively turned on and off during HCO and VCO as described above using local telephone 42. For this first purpose, sound card 110 is not necessary.

Second, audio-in connector 102 and audio-out connector 104 allow audio signals, such as voice, to be transmitted and received from the telephone line 22. The generation and recording of such voice signals can take place via external audio processing equipment, ouch as sound card 110 or other audio processing circuitry internal to local computer 18. One use for sound card 110 is to implement a voice/data answering system.

In a voice/data answering system utilizing audio connectors 102 and 104, ITU/TDD/VOICE modem 14 will first answer an incoming call after the specified number of rings, and will enter the ITU/TDD/VOICE autodetection procedure described above. The voice/data answering system or information retrieval system will then operate as described above. If the incoming call is determined to be a voice call by any of the methods described above, then the generation and/or recording of voice signals can be accomplished via sound card 110, or other audio processing circuitry, interfacing with the telephone line 22 by means of the audio connectors 102 and 104.

The functions of sound card 110 could be performed internally to ITU/TDD/VOICE modem 14 using DSP chip 74 or DSP chip 174 as shown in FIGS. 2, 3, 6, and 7.

The answering machine, call routing, and information retrieval system described above can be implemented without the TDD capabilities and so provide these services only to voice and ITU modem callers.

9. Network Operation

Since the deaf cannot hear voice sounds over phone lines, such persons use TDDs or standard ITU modems. TDDs or ITU modems allow the deaf to view received text characters on a display screen.

The computers in many organizations are connected together in a computer network, sometimes called a "LAN" or "local area network". Such computer networks sometimes extend off site, and are then often called a "WAN" or "wide area network". Computer networks often come in "peer-to-peer" networks, or "server based" networks. In a server based network a computer or computers are designated as "servers" and provide centralized printing services, file storage, and so on.

Examples of computer networks include Novell's "Netware", Artisoft's "Lantastic", Microsoft's "Windows for Workgroups" and "Windows NT" LAN product, Banyan "Vines" network product, and others.

Figure 8:
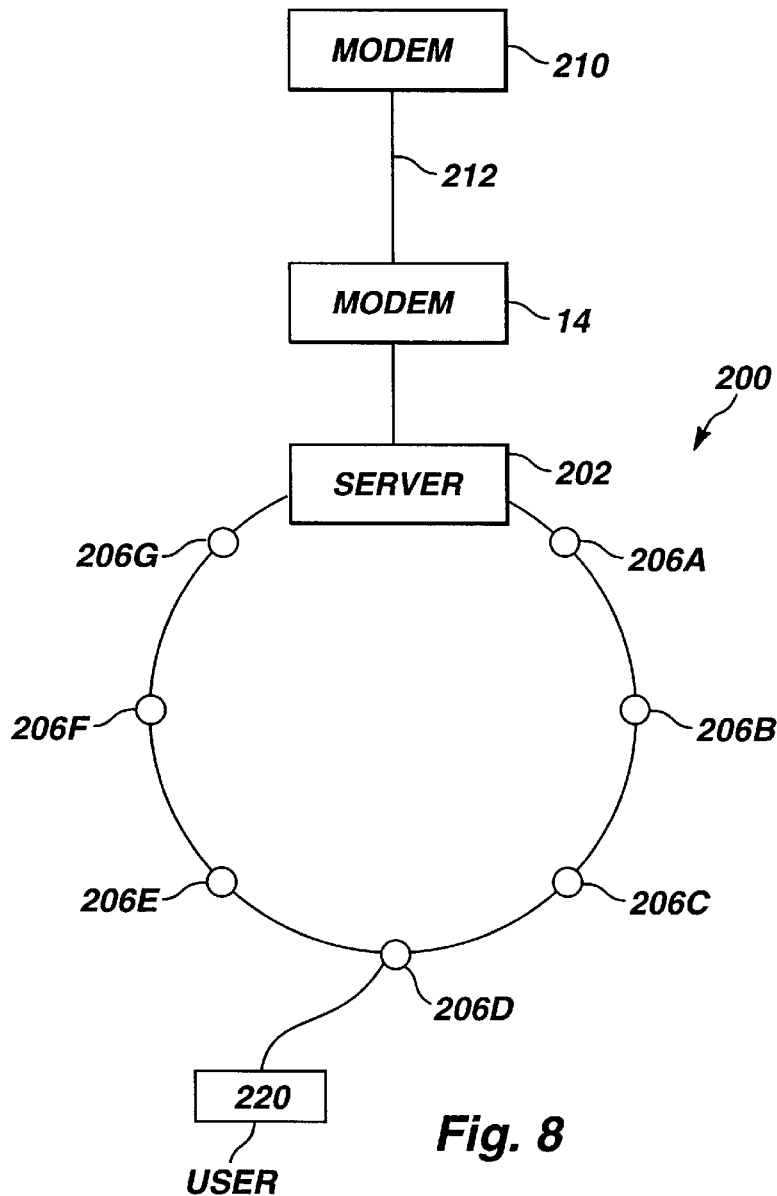
FIG. 8 is a schematic block diagram representation of an ITU/TDD/VOICE modems in a network.

Referring to FIG. 8, ITU/TDD/VOICE modem 14 is connected to a computer network "server" 202 in a network system 200. Network 200 includes multiple computers or display terminals (e.g., PCs) 206A, 206B, 206C, 206D, 206E, 206F, and 206G. ITU/TDD/VOICE modem 14 allows any of computers 206A–206G on the network to receive or originate TDD, data, or fax calls through ITU/TDD/VOICE modem 14, even if the particular computer or display terminal does not have a modem.

In operation, a remote TDD or data modem caller 210 may dial a phone number and connect (over a telephone line or other line 212) to ITU/TDD/VOICE modem 14 connected to a network server 202. The software running on network server 202 will then control ITU/TDD/VOICE modem 14, answer the call) and send a greeting and/or information to the caller. Such information may be sent under a "query/response" system whereby the server software asks the user to select "menu" choices via their TDD or computer keyboard. If the caller wishes to speak to a computer user on the network, such as user 220, the server software will query the caller 210 as to the name or phone extension of the other networked computer user. If the selection is valid and allowed by the network administrator, then the server software will cause a "alert" or "banner" to appear on the intended networked computer user informing them that they have a call.

The networked computer user may then sign on to the call and converse with the TDD or modem caller 210. The information transfer in this case will flow across the computer network 200 to/from the server computer 202 and the networked computers e.g., 206D) and to/from ITU/TDD/VOICE modem 14. From ITU/TDD/VOICE modem 14 to the remote caller 210, the information will flow across line 212.

The networked computer user 220 may also originate a call to a remote TDD or modem user 210 across line 212. In this case, the software running on the networked computer (e.g. 206D) will communicate to the server software the phone number to be dialed. The server software will then control ITU/TDD/VOICE modem 14 and cause the number to be dialed. Once the connection is made, the conversation can occur as described above.

An advantage of the implementation described above is that a particular computer user does not need to have ITU/TDD/VOICE modem 14 connected to his/her local computer. Instead, many networked computer users can share a single or few ITU/TDD/VOICE modems 14 connected to a server.

ITU/TDD/VOICE modem 14 may communicate the presence of sound energy present or not via a hardware line (e.g., an RS-232 line) connecting ITU/TDD/VOICE modem 14 and the host computer. The preferred implementation however is to communicate sound energy status via characters transmitted along with data characters, if present. This sound energy status can be a simple "con" or "off" type, or can reflect the intensity and/or frequency of sound present. The sound energy status may then be shown on the screen of the user's computer 206D in the form of an icon, bar graph, or other indicator.

Figure 9:
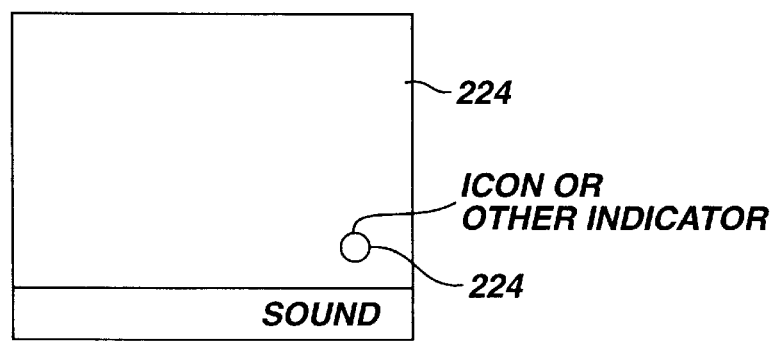
FIG. 9 is a representation of a computer display screen with an icon.

For example, referring to FIGS. 9, a display screen 224 includes an icon 226.

A particular innovation is the operation of the on-screen visual indication of sound energy in the networked computer operation described here. ITU/TDD/VOICE modem 14 attached to server 202 can communicate sound energy status information across computer network 200 to the networked computers (e.g. computer 206D). So, for example, if a networked computer user decides to originate a call, his local communications software first contacts server 202 and relays the information regarding the phone number to be dialed.

Once the server software instructs ITU/TDD/VOICE modem 14 to go off hook and dial the phone number, ITU/TDD/VOICE modem 14 may send sound energy status information to the server, and the server may resend this information to the user's communications software. The user's communications software then shows this sound energy status as an icon or other indicator on the computer screen. If the phone call is in the "ringing" or "busy" state the user can discern information as to these events by observing the "cadence" of this visual indicator. Deaf persons, in particular, are often skilled in inferring call progress by observing the cadence of a visual sound indicator since most stand alone TDD's have such sound indicators.

Relaying sound energy status from ITU/TDD/VOICE modem 14 connected to a network server 201 across the computer network 200 to the screen of a computer (e.g. 206D) will also prove useful to hearing persons. Often the speaker of ITU/TDD/VOICE modem 14 connected to a server 201 is out of earshot of a hearing user 220, and so call progress sounds such as a busy signal, ringback sounds, and so on cannot be heard from the speaker of ITU/TDD/VOICE modem 14. Therefore, sending this sound information across the LAN 205 to the computer screen of the user 220 will prove useful even if the user 220 can hear.

10. "Speed jump" during a call

The deaf population has traditionally used low speed communication protocols such as 45 baud TDD or 300 baud Bell 103 or V.21. These low speed protocols have the advantage that the typed communications may begin very quickly after the call is answered, and the lengthy modem "handshaking", of higher speed protocols, such as V.22, V.32, V.32bis, or V.34 is avoided. For instance, V.32 (9600 bps) or higher require modem handshakes of from 20 to 40 seconds or more, while Bell 103 300 baud requires only 3 or 4 seconds to establish a connection, and 45 baud TDD communications do not require any handshake at all.

While 45 or 300 baud is an adequate data transfer speed for manually typed person to person communications, these speeds are too slow for sending large files or prerecorded textual information. For instance, a 6 page text bulletin that will take only a few seconds to send at 28,800 bps, will take over an hour to send at 45 baud.

So, if a person's primary use for a modem is person to person "text telephone" typed conversations, the person faces an undesirable choice in how to answer incoming calls. Electing to answer calls at low speed 45 or 300 baud allows the connection to occur quickly, but precludes the exchange of large amounts of data during the call. Answering calls set to a higher speed ITU protocol and establishing a connection at 9600 bps or higher will allow for faster information transfers, but will take 20 to 40 seconds or more of modem handshaking to establish. Unfortunately, the answering party does not know before hand whether the higher speed connection will be needed during the call or not.

ITU/TDD/VOICE modem 14 addresses these issues in the following manner. Like most modems, ITU/TDD/VOICE modem 14 can be configured to limit the connection speed to any lower speed protocol supported by ITU/TDD/VOICE modem 14, so ITU/TDD/VOICE modem 14 may be configured to answer a call set to 45 baud TDD or 300 baud Bell 103 or V.21. This allows the typed conversation to begin very quickly. However, during the call if the two parties decide that a high speed connection is desirable for information transfer or other reasons, the connection speed may be changed from the low speed protocol to any other protocol supported by both the local and remote modems. The techniques to accomplish this as described here are supported by both the local and remote modems.

Most ITU or Bell protocols require one or more "carriers", which are audio sounds or signals on the phone line. Each ITU or Bell protocol defines the frequencies and modulation techniques for these carrier(s) as part of the protocol standard. In order to change the connection speed during a connection to a new ITU or Bell protocol, any carrier(s) present must first be terminated by either the local or remote modem. Let us call ITU/TDD/VOICE modem 14, which actively terminates the modem carrier, the "active" modem, while the remote modem is the "passive" modem. Once the active modem terminates the modem carrier then the passive modem must not hang up the call but rather enter a special modem state whereby it is "listening" for ITU modem answering tones, as well as TDD 45 baud Baudot signals. The active modem will now issue new ITU answer tones as if it has just answered a new incoming call. The passive modem must now respond to these answer tones and begin a new modem handshake. The active and passive modems may now handshake and negotiate a new modem connection up to the maximum speed supported by both modems, if current phone line conditions support this speed.

It is noted that in the above technique, one modem must take the role of the "answering" modem and the other the "calling" modem, independently of which actually answered or originated the call. Many ITU protocols require this assignment since the answering and originating modems use different frequencies. Therefore, in a preferred embodiment, the "active" modem takes the role of the answering modem and the "passive" modem takes the role of the originating modem.

It should be noted here that on loss of carrier the passive modem 14 will not hang up the call, but rather enter a carrierless mode or operation and "listen" for an ITU answer tone or answering sequence on the line. ITU/TDD/VOICE modem 14 uses its TDD mode for this carrierless mode of operation, but other carrierless protocols could also be used. It would also be possible to drop to a carrierless "null" mode of operation wherein no protocol is supported and from which ITU/TDD/VOICE modem 14 simply "listens" for ITU answer tones.

Using the technique described above, from an existing connection such as Bell 103 300 baud, V.22 1200 bps, etc., a new protocol may be entered, such as V.32bis (14,400 bps), V.34 (28,800 bps), or etc. It is also possible to move from a higher speed ITU or Bell connection to a lower speed connection, including TDD 45/50 bps operation, with this technique.

For brevity, let us call the technique described above as a "speed jump".

ITU/TDD/VOICE modem 14 may initiate a speed jump from an existing TDD Baudot connection by simply starting the ITU answering tones. The remote modem, if also a modem 14 type, will respond to these tones and the ITU handshake leading to an ITU connection (data or fax protocol) will begin.

Implementing the techniques described here is not difficult. In one method, a separate auxiliary off hook control line is placed from the modem controller 54 of FIG. 2 to the off hook control circuitry of ITU/TDD/VOICE modem 14. This auxiliary off hook control line allows the modem controller 54 to keep the phone line open, even if the modem chip data pump 74 attempts to hang up the call. For the active modem to begin a speed jump, the active modem asserts the auxiliary off hook control line to keep the phone line open, and then instructs the modem data pump 74 to hang up the call. This will terminate any modem carrier present. After a delay to allow the remote passive modem to enter the carrierless mode of operation, modem controller 54 instructs the modem chip data pump 74 to answer as if a new incoming call were present. This begins the selected ITU modem answer tones from the active modem. Of course, the phone line may be kept open as discussed above by appropriate changes in the modem firmware, and so allow the modem carrier to be terminated and new answer tones to be issued without the need for a separate auxiliary off hook control lines.

Under a preferred embodiment, software in the active modem sends control characters to the passive modem to let it know a speed jump is about to occur. In a preferred embodiment, the control characters do not show on the display screens of the active or passive modems. The control control characters can cause status messages (e.g., that a speed jump is about to occur) to appear on the display screen associated with the passive and/or active modem. However, the sending of control characters is not necessary to operation of speed jump.

As discussed above, ITU/TDD/VOICE modem 14, on loss of modem carrier, must enter a carrierless mode of operation and keep the phone line open. This can be accomplished using the auxiliary off hook control line discussed above to keep the phone line open after a loss of carrier. Once the carrier is lost, ITU/TDD/VOICE modem 14 may use tone detectors or digital bandpass filters to detect new modem answer tones. If such ITU answer tones are detected, ITU/TDD/VOICE modem 14 should configure itself as if it had just dialed a phone number and enter an ITU modem handshake as the "originating" modem. This will let a new ITU modem connection be established.

11. Vertical split Screen

Modems can be used to send and receive any type of computer data, including transmission and reception of textual characters.

Modem connections may involve two people connected via phone lines, or a person connected to a remote on-line service computer and modem, or even multiple persons all connected to a central computer system via modems.

This section (11) concerns cases where two or more persons are conversing via typed characters, and where these typed characters are shown on a both the local and remote display screens.

If two or more persons each have a modem and display screen and are typing back and forth via a phone line connection, one simple technique is to only allow one person at a time to type. When this person finishes typing, then the next person can type, and the text streams will not mingle on the display. The disadvantage of this method is that only one person can type at a time, or else the display screens will not properly show the conversation.

It is sometimes advantageous to allow two or more persons to type at the same time to interrupt, comment, etc. In a second technique, two or more horizontal windows are formed on each display screen, one for each party in the conversation, and each can type in his or her "window" without mingling text with another party.

In a third technique, a single window or screen area may be used, but the text streams are "packetized", into indivisible units. Party 1 may type and hit the carriage return key, or other key, and the typed text will be sent all at once as an indivisible packet. If Party 2 sends a text packet even 1 microsecond later, then the Party 1 text will appear first in its entirety, followed by the Party 2 text. The text on the display screen(s) will not mingle, and this technique lends itself to many parties to a group conversation, since the display screen need not be divided. The indivisible packet technique means the text from one party will not mingle with the text from another party. A disadvantage of this technique is that a remote party cannot watch as the local user types each character, and so is not like a normal voice conversation. In a normal voice conversation, the hearing party listens as each word as uttered, and can comment while the local party speaks.

A high priority in the present invention is to make typed conversations as much like normal voice conversations as possible. Another priority is to properly save a transcript of the conversation for later viewing or printing.

Figure 10:
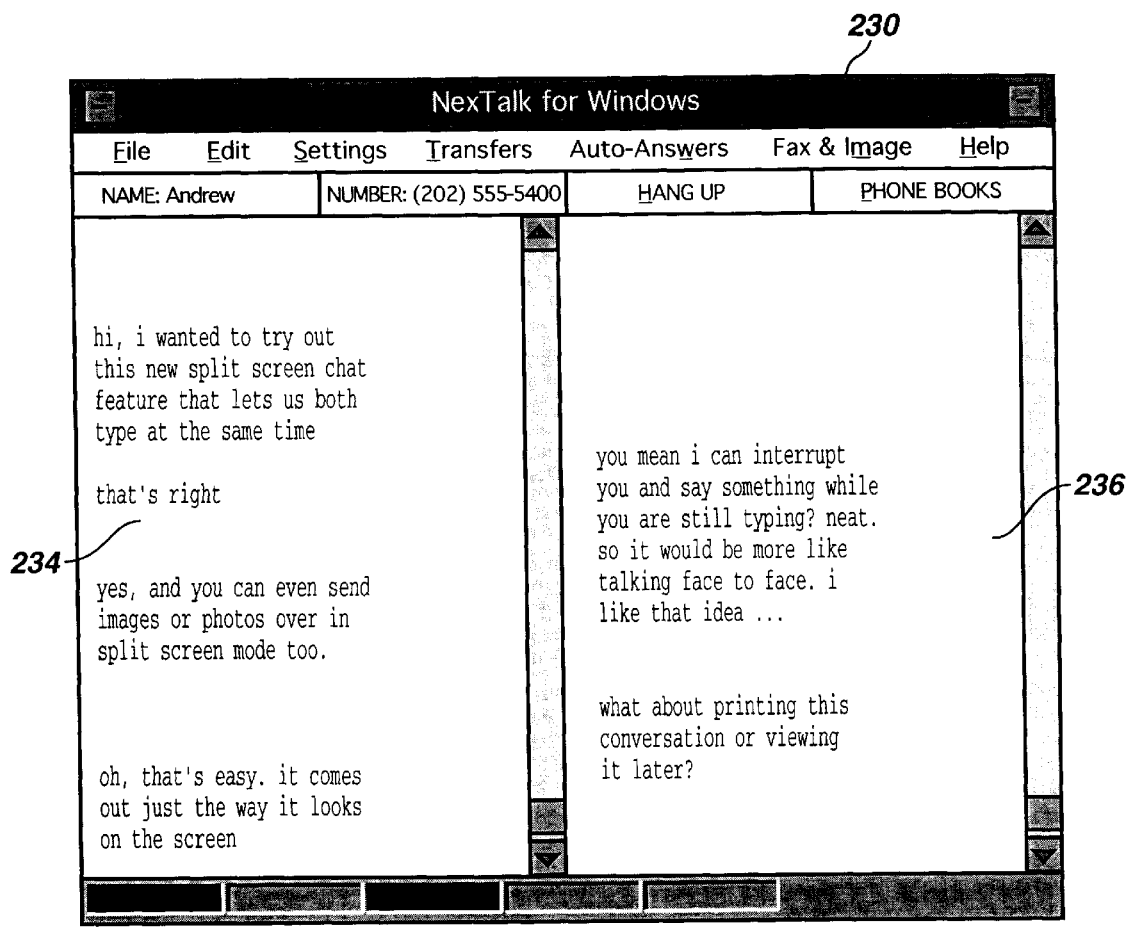
FIG. 10 illustrates a display screen with a split vertical screen.

Referring to FIG. 10, the screen 230 of a display is divided vertically into areas or windows 234 and 236. Each party to the conversation is assigned a vertical area of the screen or "window". For example, as party #1 types, the conversation forms in screen area 234. Now, if party #2 wishes to comment or interrupt, text of party #2 will be placed in the second vertical screen area 236, roughly or exactly in line with the present line being typed, or the last line typed, of party #1. (The screen may be divided into more than one area or window, for more than two persons in the conversation).

The present innovation preserves the "time" dimension so important to human conversations. Suppose party #1 says "I want you to do A", and party #2 says "no", then party #1 says, "then will you do B?", and party #2 says "maybe", and then party #1 says "then how about C?", and party #2 says, "yes".

This feature of the present invention allows the remote party to see each typed character as it is typed, so that the continuous nature of human conversation is preserved. The remote party does not wait until the return key, or some other key, is pressed to see what the local party has typed. The remote party can type comments or responses while the local party types without interrupting the local party, yet the conversation is formatted on the display screen to show the time dimension of the conversation. In the conversation example above, for instance, when the one party says "then will you do B?", the response "maybe" will show on both display screens so that the word "maybe" is approximately in line with the appropriate question so that a later transcript of the conversation will make it clear which query elicited this response.

The data written onto screen 230 may be stored in memory for later recall or printing in hard copy format. Such a hard copy print out will be formatted exactly or similarly to the display screen as shown in FIG. 10.

12. Special provision for 300 BPS connections on call originate

Standard "high speed" ITU modems (9600 bps or higher) have a complex "automode" process on call originate and will fall down or fall back from their higher speeds to lower speeds as required. So, a standard high speed ITU modem will in general fall back and connect to a 300 bps Bell 103 or V.21 modem if the answering 300 bps modem continues the answer tone long enough for this "fall back" process to occur.

However, existing TDD/300 bps devices in use by the deaf often emit a comparatively short Bell 103 or V.21 answer tone of only 3 or 4 seconds, and then if the 300 baud connection is not achieved will begin TDD 45 or 50 baud operation. The automode "fall back" process used by standard ITU modems will not connect to these devices at 300 bps since there is insufficient time for the "fall back" process to occur. One solution is for the answering party to extend the length of the 300 baud answer tones on their machine, but this is not always possible on given devices used by the deaf. The usual solution to this problem is for the calling party to explicitly restrict the originating modem connection speed to 300 bps only so that the ITU modem does not have to fall down from higher speeds to 300 bps. The problem with this solution is that ITU/TDD/VOICE modem 14 will not achieve higher speed connections if the call is in fact answered by a modem capable of higher speeds.

The innovation introduced here is this: on call originate ITU/TDD/VOICE modem 14 can operate with conventional ITU modem automode procedures and can connect to answering ITU modems up to the maximum connection speed supported by ITU/TDD/VOICE modem 14. But, in addition to these conventional automode procedures ITU/TDD/VOICE modem 14 adds a separate band pass filter to listen specifically for 2225 Hz. tones. This frequency is used by Bell 103 and V.21 300 bps protocols. After dialing a phone number, if the 2225 Hz. frequency tone is detected, ITU/TDD/VOICE modem 14 will bypass the conventional ITU modem automode procedures and immediately begin Bell 103 or V.21 300 bps operation. ITU/TDD/VOICE modem 14 may also set a bandpass filter to listen for 1400 and/or 1800 Hz. to detect an answering TDD device.

The present innovation may allow ITU/TDD/VOICE modem 14 to connect at 300 bps to TDD/300 bps devices with very short 300 bps answer tones, and yet also allows higher speed connections to any standard ITU modem.

13. Voice recognition

ITU/TDD/VOICE modem 14 may include voice recognition for deaf communications A speaking person, either hearing or deaf, may speak and ITU/TDD/VOICE modes 14 will perform speech to text voice recognition and send the text as data over the phone line to the remote user. The transmitted text will then appear on the display screen of the TDD or computer of the remote user just as if it was typed at the local end.

Voice recognition (speech to text conversion) serves here to replace manual typing when a speaking person is communicating with a deaf person over a phone line. ITU/TDD/VOICE modem 14 may allow this text stream to be sent as Baudot characters to the screen of a TDD, or as ASCII or some other character encoding. This technique will make it much more convenient for speaking persons to converse with a deaf person by telephone, particularly for those speaking persons who do not type well.

The above innovation can then be combined with several techniques which allow the deaf person to communicate back. If the deaf person cannot speak, then an easy solution is for the deaf party to type back to the hearing party, so that the typed characters appear on the display screen of the computer or text telephone of the hearing party. If the deaf party can speak, then the voice recognition described above can be combined with "simultaneous voice and data" (SVD) techniques. In "SVD" the sounds of the voice are digitized and sent as data over the phone line, and the receiving system reconstructs the received data into the sounds of the voice. Combining these two techniques allows both the hearing and the deaf party to speak. The hearing person's voice is converted into text and sent to the display of the deaf person, and the deaf person's voice is sent as data and reconstructed as the sounds of the voice for the hearing person to hear.

ITU/TDD/VOICE modem 14 may also employ voice recognition across the phone connection. In this model a deaf local user can call a speaking person The speaking person's voice will be transmitted across the phone line to ITU/TDD/VOICE modem 14, and speech to text conversion performed locally. Then, the recognized textual information will appear on the display screen of the local computer 18. This feature of the invention may be used by two hearing persons as well as by those who are hearing impaired.

14. Typing during a file transfer

Conventional file transfer protocols used by standard ITU modems, such as Zmodem, Xmodem, Ymodem, etc., do not allow the user to type text to the remote party during a file transfer. Most users of ITU standard modems exchange files with BBS systems or other on-line systems and do not have a need to exchange typed comments or information during an active file transfer.

ITU/TDD/VOICE modem 14 and software however is designed as a "text telephone" for person to person communications. A modem 14 user might wish to send a file or image to the remote party, but also wish to continue with the on-going conversation during this transfer.

Most file transfer protocols form "packets" of data and send/receive these data packets. Each packet typically contains error correction checksums to guard against transmission errors.

The file transfer approach described here also "packetizes" the data to be sent. Let us call this new file transfer protocol "NXmodem". As the NXmodem protocol forms each new packet to be sent, it checks whether any keys have been typed by the local user. It there are keys pressed, then the protocol places the typed characters inside the next packet to be sent. The remote modem software analyzes each packet, and if typed characters are found in the appropriate section of the packet, will strip out these characters and display them on the screen of the remote user. This process of course can work in the reverse direction.

Since the duration of file or image transfers can be quite lengthy the innovation described here will allow ITU/TDD/VOICE modem 14 "text telephone" to continue to serve as a telephone during the file transfer period. The local and remote users may continue to type back and forth during a file transfer.

15. Prevention of file transfers or high speed information transfers

Many private businesses or government agencies have security procedures which prohibit or restrict employees or others from access to a modem. A modem is viewed at such organizations as a security threat, since sensitive computer files or information can be transmitted off site. Modems can also receive information from off site, and this causes security concerns since computer "viruses" may be brought into the organization in this manner.

Communications for the deaf presents problems for such organizations. The deaf usually require some type of modem for text telephone use, yet for the reasons just mentioned, modems are seen as undesirable devices in many organizations. Many organizations would like to accommodate their deaf employees and/or deaf clients, but are concerned with the security implications of modems.

This feature of the present invention addresses these problems in the following manner.

First, ITU/TDD/VOICE modem 14 can be viewed as strictly a "text telephone" for deaf communications in the present circumstance, and not as a general purpose modem. A text telephone only needs to send text, that is, letters, numbers, and punctuation marks. So, in the "ASCII" character table a text telephone need not send or receive "control" characters such as decimal 01, 02, 03, etc. In fact, most of the decimal characters below 32 are control characters in the ASCII table and are not needed for textual communications. (It might be noted that the traditional deaf text telephone, the TDD, supports a very limited character set of only 63 characters, and indeed does not support upper and lower case letters. TDDs only support one case of letters, so that "Joe Smith" is send and received as either "joe smith" or "JOE SMITH".)

While control characters are not needed for textual conversations, they are used in common file transfer protocols, and are found in many files, particularly executable program filer.

This feature of the present invention modifies ITU/TDD/VOICE modem 14 programming so that certain bytes are not sent or received by ITU/TDD/VOICE modem 14. Suppose ITU/TDD/VOICE modem 14 is in an active connection with a remote modem, and local computer 18 sends decimal "49 50 51 01 02 52" to ITU/TDD/VOICE modem 14. Normally, ITU/TDD/VOICE modem 14 would then transmit this character stream to the remote modem. However, ITU/TDD/VOICE modem 14, according to this feature of the present invention, will transmit only "49 50 51 52" to the remote modem 28, and will not transmit, for example, the control codes 01 or 02. Similarly, if the local modem 14 receives the characters "49 50 51 01 02 52" from the remote modem 28, it will eliminate the 01 and 02, and transfer only "49 50 51 52" to the local computer 18. This restriction is performed in the modem firmware itself, and is not dependent on the communications software running on the local computer 18.

It is noted that the control codes 01 and 02 are particularly important in common file transfer protocols such as Zmodem, Xmodem, etc., and by eliminating these characters from the data stream ITU/TDD/VOICE modem 14 will effectively render inoperative these file transfer protocols. It is also noted that computer program executable files will usually include all or most characters from zero to 255 decimal, and eliminating a block of characters from transmission or reception will generally make it difficult to send such executable programs. The particular codes not transferred may be permanently written into the firmware, or be modifiable.

ITU/TDD/VOICE modem 14 may also restrict connection speeds. For instance, ITU/TDD/VOICE modem 14 may be configured to allow only 45 or 50 baud TTY. Since 45 or 50 baud TTY uses the 5 bit Baudot code, and is very slow, this would make it difficult or impossible to send most computer files. Similarly, configuring ITU/TDD/VOICE modem 14 to allow only 300 baud, and/or 45 or 50 baud TDD, will at least prevent high speed information transfers to or from remote systems.

B. Additional Details Regarding Circuitry and Software

The hardware described herein may be implemented by using well known commercially available components in a standard well known manner. However, the following details are provided for the convenience of the reader.

In one embodiment, micro-controller 54 includes two microprocessors. A first microprocessor, which may be a 73D2910 model marketed by Silicon Systems, Inc. (SSI) of Tustin, Calif., controls DSP chip 74. DSP chip 74 may be an ADSP-2115, marketed by Analog Devices. A codec may be an AD28msp01, marketed by Analog Devices.

The 73D2910 controller requires firmware in external memory 58. (Other suitable processors may have internal memory.) The firmware used to implement a standard ITU modem are available from Silicon Systems, Inc. (SSI). SSI makes available most of the source code of the 73D2910 controller to original equipment manufacturers (OEMs). This source code is in an Intel 8032 microprocessor assembly code format and may be modified and recompiled freely by OEMs. Specifically, the 73D2910 firmware may be modified to provide functions described herein, recompiled to object form, and "burned" into a memory 58 (or perhaps memory 76), which may be a 27C512 type EPROM, available from several manufacturers such as National Semiconductor, Intel, and Hitachi.

SSI also makes available complete hardware design schematics for a standard ITU modem compatible with the SSI 73D2910 firmware, as well as design manuals. See the "K-SERIES MODEM DESIGN MANUAL", as well as the "73D2247 DESIGN MANUAL" (available from SSI) for complete information on the structure and functions of the SSI firmware as well as informative discussions of the required hardware implementation.

ITU/TDD/VOICE modem 14 may be constructed by starting from the complete reference design provided by SSI for an ITU modem and adding the functionality described herein. For instance, the addition of TDD Baudot transmission and reception may be added to the basic design in the following manner.

A second microprocessor may be added to the SSI reference design, such as a MC68EC1-A1 model marketed by Motorola. This second microprocessor may control the TDD communications. Generation of the Baudot TDD FSK signal can be done with a digital line of the MC68HC11A1 passed through a low pass filter. The "output compare" function of the MC68HC11 family, available on pert pins PA3 through PA6 of the MC68HC11A1 provide an efficient way to generate 1400 and 1800 Hz. square waves which can then be filtered to obtain the desired TDD signal FSK sinusoid. See the "M68HC11 Reference Manual" available from Motorola Semiconductor for information on the use the "output compare" function of these pins.

The detection of the TDD Baudot signals may be done by using two LM567 tone detectors, available from National Semiconductor. The LM567 tone detector is a phase locked loop integrated circuit which can be set or "tuned" to a specific frequency such as 1400 or 1800 Hz. This "tuning" is accomplished with resistor-capacitor values. See the data sheet on this part available from National Semiconductor. One LM567 may be &et to 1400 Hz. and the other LM567 set to 1800 Hz. Each LM567 provides an open collector digital output line which may be monitored by the MC68HC11A1 microprocessor. A logic low signal present on one of these lines means that there is energy in the frequency band of the part presented to the input pin. The input pins of these two ICs connect to phone line 22, buffered by an amplifier, so that the tone detectors can detect TDD signals on the telephone line 22.

The firmware of the MC68HC11A1 monitors the digital output lines of the two LM567 tone detectors and reconstruct each Baudot TDD character received. As each TDD character is received, the character may be sent to local computer 18 via the port linking ITU/TDD/VOICE modem 14 to the local computer, or may be stored in internal memory 58, or both.

Since memory 58 of the ITU/TDD/VOICE modem 14 stores ITU, TDD, and/or voice signals, it is desirable that this memory be "nonvolatile" and maintain its integrity if power is removed from ITU/TDD/VOICE modem 14. EEPROM memory such as 28C256, or flash EPROM memory, such as 29C256 may be usefully employed in this regard.

The functionality of the ITU/TDD/VOICE modem described herein may be achieved by suitable modification of the firmware of the 73D2910 and/or the MC68HC11A1 microprocessors. It should be noted that the 73K224L modem chip firmware is internal to the integrated circuit and may not be modified by the OEM. Modification of the 73K224L firmware, however, is not necessary in the implementation.

The hardware modifications necessary to the basic design schematics provided by SSI are minimal and will be apparent to those skilled in the art. The extra indicator light LEDs, such as 90A–90L, may be added, as well as buttons 46 and 48, if desired.

Local computer 18 is loaded with communications software that interacts with ITU/TDD/VOICE modem 14. The communications software performs many of the standard functions that communications software typically performed. For instance, when the ITU/TDD/VOICE modem 14 is acting in ITU mode standard communications software such as Procomm, Crosstalk, Smartcom, and so on may be used. In order to use the additional features of modem 14, however, standard communications software is inconvenient to use since there are additional modem commands necessary. Additional functions of the communications software in local computer 18 include the following. First, the enabling software allows the local user to change parameters and messages of ITU/TDD/VOICE modem 14. So, for example, the communications software can offer a convenient means to type the prestored outgoing message and download this text to modem memory 58. Similarly, the stand alone answering machine greeting text, or the text necessary for an information retrieval system described herein may be conveniently typed through the communications software of local computer 18 and downloaded to memory 58 or perhaps memory 76. Second, the communications software active on local computer 18 could support one of the query techniques described herein to obtain the "status packet" information from ITU/TDD/VOICE modem 14. Third, the other features described herein, such as voice recording and playback, could be supported in the communications software for the convenience of the user.

The communications software may be effectively written in a state machine format. The state machine includes rows and columns. The rows represent possible states of ITU/TDD/VOICE modem 14 and the columns represent possible events. The action taken by the communications software is determined by the intersection of the event/column and the state/row. When a particular event occurs the software ascertains the current state of ITU/TDD/VOICE modem 14, which is a row in the table, and finds the intersection of that row and the current event/column. The communication software on local computer 18 will then track the status or modes of the ITU/TDD/VOICE modem 14, or will issue further commands to the ITU/TDD/VOICE modem 14 as needed.

It is noted that the five bit Baudot TDD code is not suited to binary file transfer. Therefor, the problems discussed above in issuing commands to ITU/TDD/VOICE modem 14 in an ITU on-line connect state do not apply to a TDD on-line connect state. Accordingly, one implementation does not use the "AT" command structure to issue commands to ITU/TDD/VOICE modem 14 in TDD mode. In TDD mode, ITU/TDD/VOICE modem 14 can immediately respond to special characters not found in the Baudot character set. Specifically, a format of <esc> <esc> % X, where X varies with each possible command may be used.

It is believed that a graphical "windows" version of the software may be more user friendly than other types of software.

The following describes a preferred software and system for signalling between two modem systems. Modems are complex devices and have many possible protocol settings and modes of operation. Protocol settings include the current file transfer protocol, current parity and stop bit settings, current echo style (full or half duplex), and so on.

A common problem in modem communications is that one side of a modem connection will have one protocol settings while the other side will have an incompatible protocol setting. So for instance, the local computer user may wish to initiate a "Zmodem" file transfer, but the remote modem system is set to NXmodem". Another example might be when the local computer user is set to even parity, 7 data bits, and 1 stop bit, while the remote modem system is set to no parity, 8 data bits, and 1 stop bit. Such protocol incompatibilities can cause communications between the modem systems to fail or not operate properly.

A particular innovation in the modem system is that a communications signalling system may be implemented to coordinate the operating modes of the local and remote modem systems. In the modem system described here the local and remote modem systems may send groups of characters back and forth to ensure that both local and remote modem systems have compatible protocol settings needed for proper operation. In the preferred implementation, this group of characters will not appear on the display screen of either the remote or local modem system, and will be hidden from the user's view. In another implementation the display screens of either the local or remote modem systems will show some or all of the signalling characters being sent or received.

As an example of this innovation, if the local computer user, or the local modem system during automated operation, wishes to initiate a Zmodem file transfer, the local modem system can send out a group of characters to the remote system to check which file transfer protocol is currently set in the remote system. If the remote modem system is currently set to an incompatible file transfer protocol, then one or both display screens may then display a text message explaining the nature of the problem and asking the remote or local users to take corrective action, or the corrective action may be taken by one or both modem systems automatically to correct the problem and allow the file transfer to proceed. Other uses of the modem signalling system in resolving other modem protocol incompatibilities will be apparent.

An important use for the communications signalling system described here is to resolve incompatible protocol settings between two modem systems. Other uses may be imagined. For instance, the user operating the local modem system may wish to interrogate the remote modem system for the version release of the remote modem system to check for system capabilities. Another example might be to interrogate a remote system and obtain pre-recorded information such as the remote user's name, address, or etc. The modem system may include a setting for the user to select whether this type of automatic query will be answered.

In one implementation, the signalling characters are hidden and not displayed on the display screens of either the local or remote users. In this implementation, a means must be provided to detect signalling characters from normal text characters. One method is to use only the "lower block" ASCII characters from 0 to 127 decimal for normal textual characters, and use the "upper block" ASCII characters from 128 to 255 decimal for the signalling characters. In this manner, only lower block ASCII characters are displayed on the user's screens.

Another method would be to "shield" the signalling characters from the normal textual characters by using a non-printing control character in front, and optionally in back, of the signalling character group. The ASCII character table contains many non-printing characters in the range from 0 to 31 decimal which could be used in this system. So for instance, the signalling group of characters could begin with a decimal 5, and end with a decimal 6. Since 5 and 6 are not normally found in ASCII text, these characters will serve to delimit the signalling group of characters and allow the modem system to suppress the display of all the characters in the group. Other methods will be apparent, and a little used printing character or characters could be used instead of a non-printing character.

C. ITU/TDD Modem

The various details described above in connection with FIGS. 1–3 also apply to FIGS. 4–7, except where expressly stated otherwise or where from the context do not apply.

Figure 4:
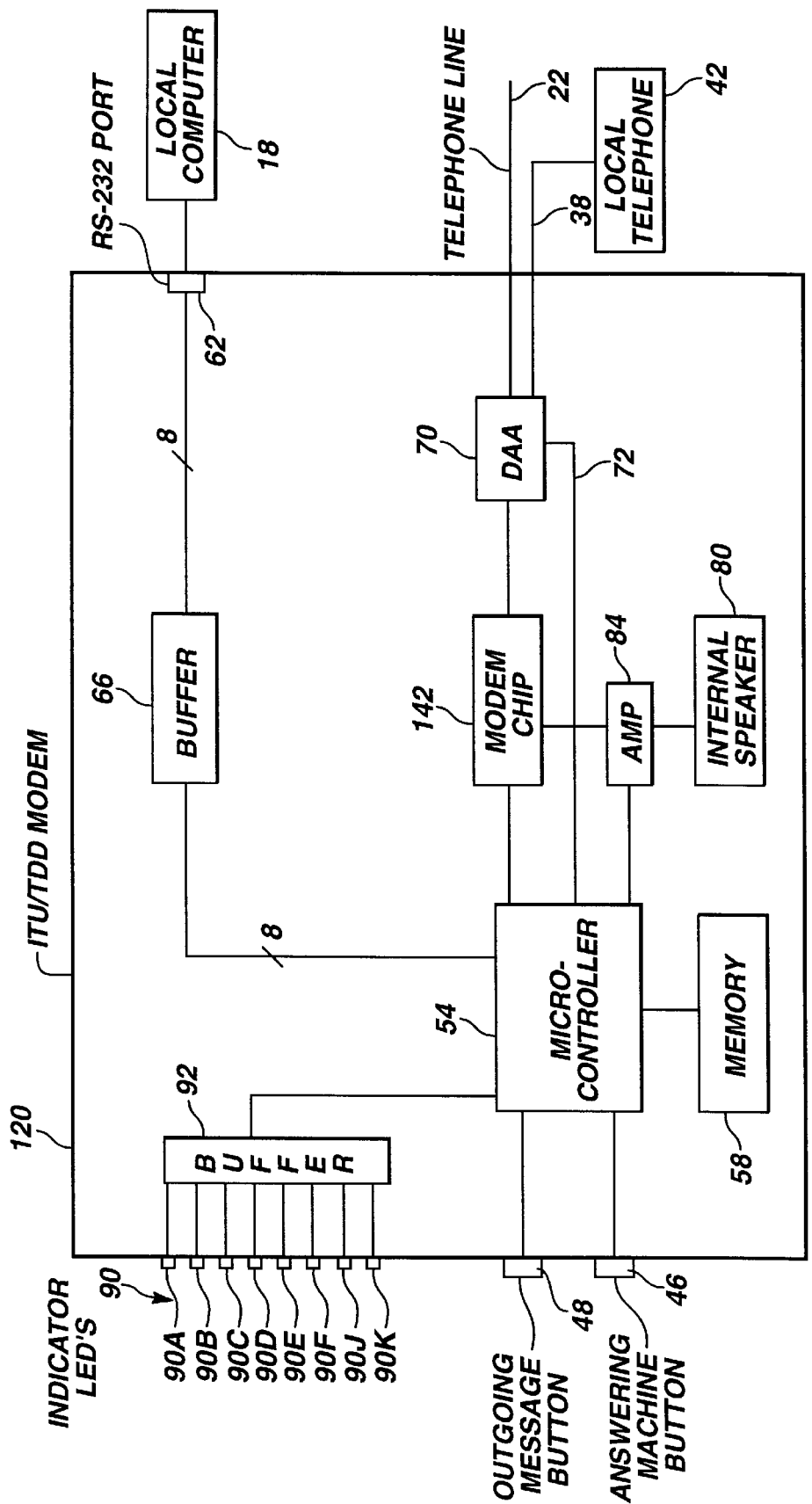
FIG. 4 is a schematic block diagram representation of an ITU/TDD modem according to the present invention.

FIG. 4 shows an ITU/TDD modem 120 that includes essentially the some structure and performs many of the same functions as ITU/TDD/VOICE modem 14. However, ITU/TDD modem 120 does not include voice capability. Accordingly, in a preferred embodiment, ITU/TDD modem 120 does not include audio processing, including voice detection, capability.

A modem chip 142 replaces DSP chip 74 between DAA 70 and micro-controller 54. Modem chip 142 may include a codec (ADC and DAC) for processing signals to and from DAA 70. The first microprocessor, mentioned above, which may be a 73D2910 model marketed by Silicon Systems, Inc. (SSI) of Tustin, Calif., may control modem chip 74. Modem chip 142 may be a model K-series chip (such as the 73K224L) marketed by Silicon Systems, Inc. of Tustin, Calif.

ITU/TDD modem 120 may include some or all of the modes and features described above except those that involve voice. Of course, ITU/TDD modem 120 could pass telephone voice signals through phone connector 38 or audio connectors 102 and 104 (see FIG. 3) to or from telephone line 22 without otherwise processing the signals. For example, voice signals could be transmitted between telephone line 22 and local telephone 42, and between sound card 110 and telephone line 22.

The answering machine mode in ITU/TDD modem 120 could include the ability to allow local computer 18 to take over control of the answering machine in ITU/TDD modem 120. The take over could be manually executed via button 46 or other actuator.

In a preferred embodiment, ITU/TDD modem 120 includes LEDs 90A–90K, but not LED 90L.

D. ITU Modem

FIG. 5 shows an ITU modem (or standard modem) 140 that includes essentially the same structure (except as shown otherwise) and may include one or more of the modes and functions described above in connection with ITU/TDD/VOICE modem 14, except for those that are directed only to TDD or voice applications. ITU modem 140 does not include TDD or voice capability. Accordingly, in a preferred embodiment, ITU modem 140 includes LEDs 90A–90F and 90J–90K, but not LEDs 90G, 90H, 90I, and 90L, and does not include audio processing, including voice detection, capability.

The answering machine mode in ITU modem 140 could include the ability to allow local computer 18 to take over control of the answering machine in ITU modem 140. The take over could be manually executed via a push button or other actuator.

Of course, ITU modem 140 could pass telephone voice signals through phone connector 38 or audio connectors 102 and 104 (see FIG. 3) to or from telephone line 22 without otherwise processing the signals. For example, voice signals could be transmitted between telephone line 22 and local telephone 42, and between sound card 110 and telephone line 22. Although it is unlikely, TDD signal could be passed from local computer 18 through ITU modem 140 without their being processed by ITU modem 140.

E. ITU/VOICE Modem

Figure 6:
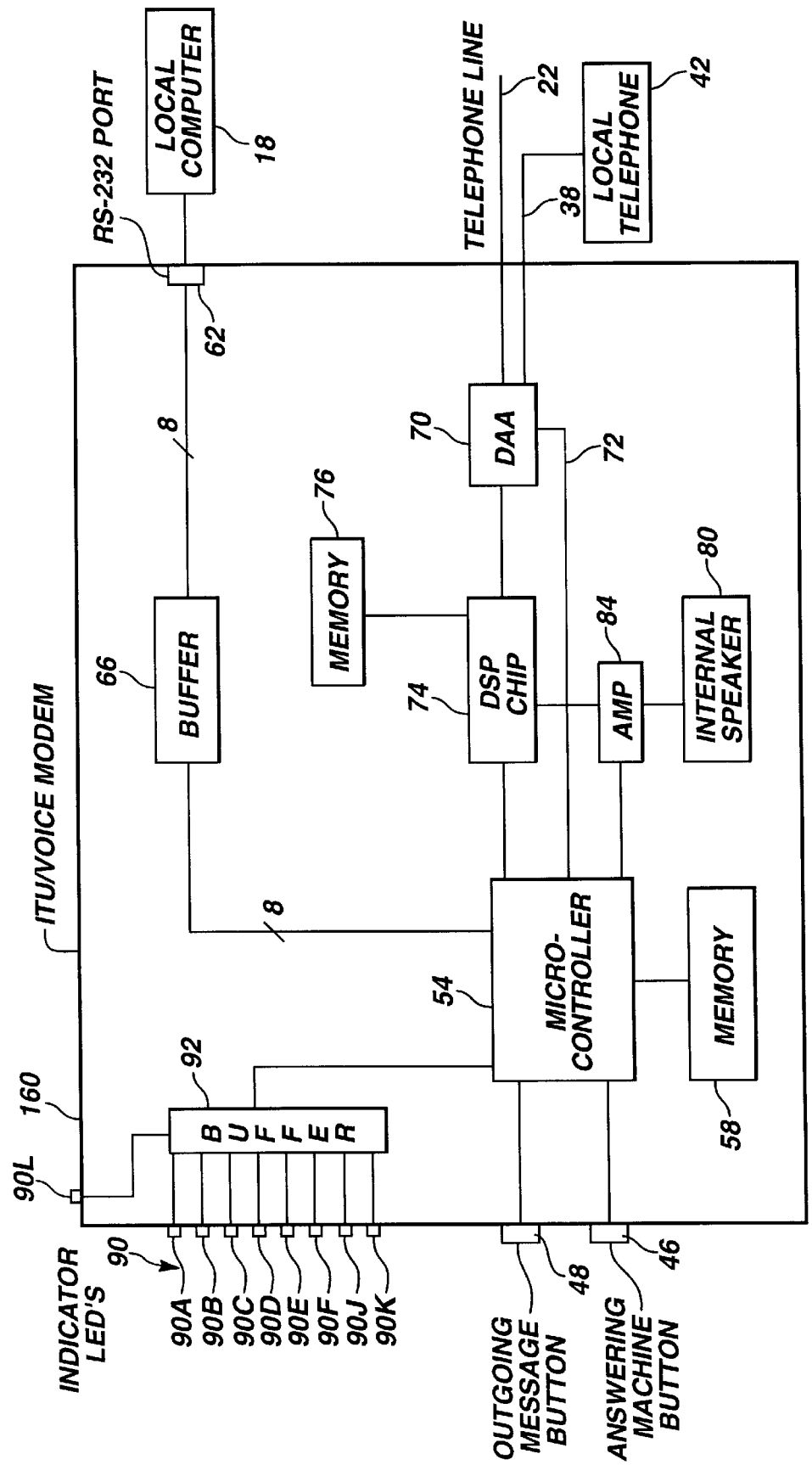
FIG. 6 is a schematic block diagram representation of an ITU/VOICE modem according to the present invention.

FIG. 6 shows an ITU/VOICE modem 160 that includes essentially the some structure and performs many of the same functions as ITU/TDD/VOICE modem 14. However, ITU/VOICE modem 160 does not include TDD capability. Accordingly, in a preferred embodiment, ITU modem 160 includes LEDs 90A–90Y and 90J–90L, but not LEDs 90G, 90H, and 90I

ITU/VOICE modem 160 may include some or all of the modes and features described above, except for those that are directed only to TDD applications.

Of course, micro-controller 54 or DSP chip 74 would not need capabilities to transmit or receive TDD signals, or detecting between ITU/VOICE and TDD formats, and memory 58 would not include software related to the storage of TDD format text.

The answering machine mode in ITU/VOICE modem 160 could include the ability to allow the local computer to take over control of the answering machine in ITU/VOICE modem 160. The take over could be manually executed.

Of course, ITU/VOICE modem 160 could pass telephone voice signals through phone connector 38 or audio connectors 102 and 104 (see FIG. 3) to or from telephone line 22 without otherwise processing the signals. For example, voice signals could be transmitted between telephone line 22 and local telephone 42, and between sound card 110 and telephone line 22.

F. Variations and explanations

Figure 7:
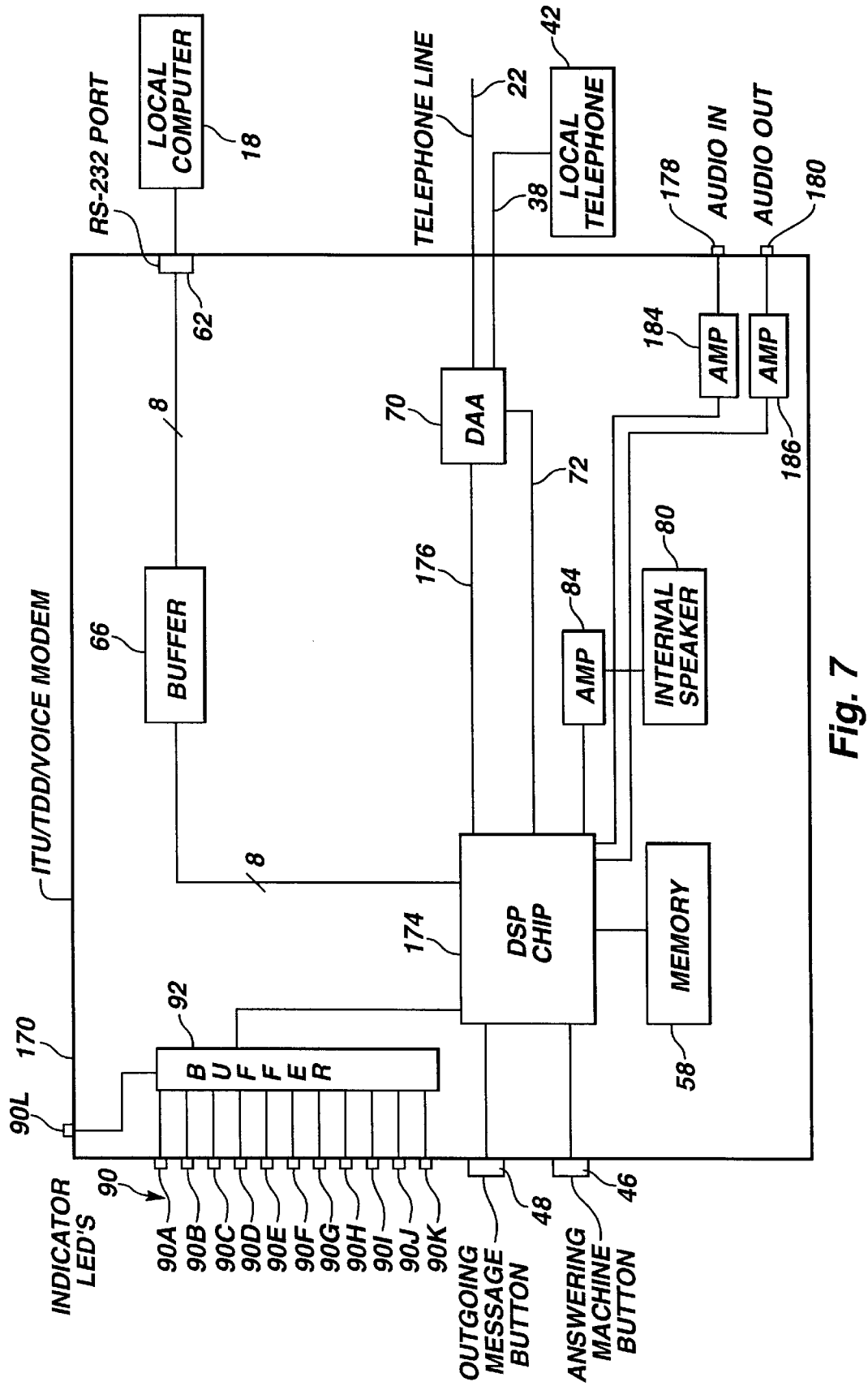
FIG. 7 is a schematic block diagram representation of an ITU/TDD/VOICE modem with alternate circuitry to that of FIG. 2.

FIG. 7 shows ITU/TDD/VOICE modem 170, which has an alternative circuit to that of ITU/TDD/VOICE modem 14, shown in FIG. 2. DSP chip 174 performs functions of both microcontroller 54 and DSP chip 74. Line 176 carries analog signals. A codec (ADC and DAC) is included in DSP chip 174 or between DSP chip 174 and DAA 70. In a preferred embodiment, ITU/TDD/VOICE modem 170 would include LEDs 90A–90L.

The basic structure of FIG. 1 may apply to each of FIGS. 4–7. For example, in FIG. 4, ITU/TDD modem 120 may be inserted in place of ITU/TDD/VOICE modem 14 in FIG. 1. In FIG. 5, ITU/TDD modem 140 may be inserted in place or ITU/TDD/VOICE modem 14 in FIG. 1. In FIG. 6, ITU/TDD modem 160 may be inserted in place of ITU/TDD/VOICE modem 14 in FIG. 1. In FIG. 7, ITU/TDD modem 170 may be inserted in place of ITU/TDD/VOICE modern 14 in FIG. 1.

The mention of an ITU modem is just an example another a standard modem could be used.

Although local computer 18 is specified to be a "PC" computer, the present invention may interface with a variety of computers running any type of operating system, including MSDOS/PCDOS, Microsoft Windows or Windows NT, IBM OS/2, any variety of Unix, or Apple Computer, Inc. operating systems. Local computer 18 could be any device with a screen for displaying text, a text entry device such as a keyboard or digitizing tablet, and capable of controlling an ITU modem. Such local computers could include lap top, palm top, or pen computers.

Answering machine button 46 and outgoing message button 48 could be a single button or in other forms such as a light detector or other user actuated detector. Further, there may be more than one prestored outgoing message button (or control) each for a unique outgoing message. A single button may be pressed more than once to select a particular message from several messages. There may be more than one prestored outgoing message and more than one answering machine greeting.

Memory 58 may be internal to or external to microcontroller 54. Moreover, memory 58 may comprise more than one chip. Memory 76 may be internal to or external to DSP 74 and may comprise more than one chip.

Memory 58 could be external to ITU/TDD/VOICE modem 14, ITU/TDD modem 120, ITU modem 140, ITU/VOICE modem 160, ITU/TDD/VOICE modem 170. Memory 76 could be external to ITU/TDD/VOICE modem 14 and ITU/VOICE modem 160. Other memory could be external to ITU/TDD/VOICE modem 170. An example of an external memory is a PCMCIA memory card. Also, memory 58 or 76 could include both internal and external portions.

The present invention could include a TDD/VOICE modem.

In a preferred embodiment, telephone line 22 connects to ITU/TDD/VOICE modem 14, etc., through an RJ-11 or similar connector. Connector 38 may also be an RJ-11 or similar.

As used herein, "electrically connected" does not necessarily mean directly electrically connected. For example, RS-232 port 62 is connected to micro-controller 54 even though they are separated by buffer 66.

It is noted that the names of organizations promulgating standards occasionally change. For example, the organization referred to as International Telecommunication Union (ITU) was formally known as Consultive Committee on International Telegraphy and Telephony (CCITT). Similarly, in the future, the organization currently referred to as the ITU change its name. Such a name change is contemplated in this specification and the following claims.

The above-recited specification provides many details, modes, and other features that may be included in various embodiments of the invention. However, specific embodiments of the invention may use some details and features, but not other details and features. Moreover, the above-recited details and features should be considered illustrative and not restrictive in that the present invention may be embodied in specific forms other than those described above. Accordingly, the scope of the invention is indicated by the following claims, including equivalents thereof, rather than by the specific embodiments described in the preceding description.

What is claimed is:

1. A computer system that can communicate with a remote device across a communication line for receiving, transmitting, and displaying textual characters, comprising:
   a modem for communicating with the remote device; and
   a computer having a display screen and an electrical connection to the modem whereby the computer can communicate with the remote device, the computer including software that formats the textual characters into a vertical split screen having vertical areas on the display screen, wherein textual characters from the computer are displayed in one vertical area and textual characters from the remote device are displayed in another vertical area, and wherein the computer software instructs the modem to transmit and receive control characters with the remote device to synchronize protocol settings with the remote device thereby providing compatible operation and synchronization of the textual characters between the vertical areas, and wherein the textual characters of one vertical area are synchronized with the textual characters of the other vertical area to thereby reflect the real time transmission of the textual characters and maintain the relative timing of the communication between the computer system and the remote device, and wherein in the event of simultaneous communication the computer maintains the textual characters of one vertical area substantially in line with the textual characters of the other vertical area.

2. The computer system of claim 1, wherein the computer includes a memory and wherein the textual characters are stored in the memory for later recall on the display screen in substantially the same format as originally displayed on the display screen.

3. The computer system of claim 1, wherein the textual characters are transmittable to a printer in electrical communication with the computer and wherein the printer produces a printout of the textual characters in substantially the same format as displayed on the display screen.

4. The computer system of claim 1, wherein the modem is in communication with a plurality of remote devices and wherein the computer includes software for formatting the textual characters from the computer and each remote device into a respective vertical area on the display screen, and wherein the textual characters of each vertical area are synchronized to reflect the real time transmission of the textual characters and maintain the relative timing of the communication between the computer system and the remote devices.

5. The computer system of claim 4, wherein the software maintains the textual characters of each vertical area substantially in line with the textual characters of the other vertical areas to maintain the relative timing of the communication between the computer system and the remote devices.

6. The computer system of claim 4, wherein the computer includes a memory and wherein the textual characters are storable to the memory for later recall on the display screen in substantially the same format as originally displayed on the display screen.

7. The computer system of claim 4, wherein the textual characters are transmittable to a printer in electrical communication with the computer and wherein the printer produces a printout of the textual characters in substantially the same format as displayed on the display screen.

8. The computer system of claim 1, wherein the control characters are not displayed on the display screen.

9. A computer system for communicating between a local and remote location for receiving, transmitting, and displaying textual characters, the computer system, comprising:
   a local modem;
   a remote modem connected through a communication line to the local modem;
   a local computer electrically connected to the local modem and including a local display screen;
   a remote computer electrically connected to the remote modem and including a remote display screen, whereby the local and remote computers may communicate through the local and remote modems; and
   the local and remote computers including software that formats the textual characters into vertical areas on the local and remote display screens, wherein textual characters from the local computer are displayed in one vertical area and textual characters from the remote computer is displayed in another vertical area, and wherein the local modem and the remote modem transmit and receive control characters with one another to synchronize protocol settings and thereby provide compatible operation and synchronization of the textual characters between the vertical areas, and wherein the textual characters of one vertical area are synchronized with the textual characters of the other vertical area to thereby reflect the real time transmission of the textual characters and maintain the relative timing of the communication between the local and remote computers, and wherein in the event of simultaneous communication the software of the local and remote computers maintains the textual characters of one vertical area substantially in line with the textual characters of the other vertical area.

10. The computer system of claim 9, wherein the computer system includes a memory and wherein the textual characters are stored to the memory for later recall to display the textual characters on the display screens in substantially the same format as originally displayed on the display screens.

11. The computer system of claim 9, wherein the textual characters are transmittable to a printer in electrical communication with the computer system and wherein the printer produces a printout of the textual characters in substantially the same format as displayed on the display screens.

12. The computer system of claim 9, further comprising:
   at least one additional remote modem connected through the communication line to the local modem and remote modem;
   an additional remote computer electrically connected to the at least one additional remote modem and including an additional remote display screen, whereby the additional remote computer may communicate through the additional remote modem; and
   the local and remote computers including software that formats the textual characters from the local and remote computers into separate vertical areas on the local and remote display screens, and wherein the textual characters of each vertical area are synchronized with the textual characters of the other vertical areas to thereby reflect the real time transmission of the textual characters and maintain the relative timing of the communication between the local and remote computers.

13. The computer system of claim 12, wherein the software of the local and remote computers maintains the textual characters of each vertical area substantially in line with the textual characters of the other vertical areas to maintain the relative timing of the communication between the computer system and the remote devices.

14. The computer system of claim 9, wherein the control characters are not displayed on the local display screen and the remote display screen.

15. A computer-readable medium whose contents cause a computer system to communicate with a remote device across a communication line for receiving, transmitting, and displaying textual characters by performing the steps of:

forming a connection between the computer system and the remote device to allow transmission and reception of textual characters;

formatting a display screen of the computer system into a vertical split screen having vertical areas on the display screen, wherein textual characters generated from the computer system are displayed in one vertical area and textual characters received from the remote device are displayed in another vertical area; and synchronizing the textual characters of one vertical area with the textual characters of the other vertical area to thereby reflect the real time generation of the textual characters and maintain the relative timing of the communication between the computer system and the remote device.

16. The computer-readable medium of claim 15, whose contents cause a computer system to further perform the step of:

maintaining the textual characters of one vertical area substantially in line with the textual characters of the other vertical area in the event of simultaneous communication to maintain the relative timing of the communication between the computer system and the remote device.

17. The computer-readable medium of claim 15, whose contents cause a computer system to further perform the steps of:

storing the generated textual characters of the computer system and the remote device in a memory of the computer system for later recall; and displaying the textual characters on the display screen in substantially the same format as originally displayed on the display screen.

18. The computer-readable medium of claim 15 whose contents cause a computer system to further perform the steps of:

transmitting the textual characters to a printer in electrical communication with the computer system; and producing a printout from the printer of the textual characters in substantially the same format as originally displayed on the display screen.

19. The computer-readable medium of claim 15 whose contents cause a computer system to further perform the steps of:

generating control characters;

transmitting the control characters to the remote device; and processing received control characters from the remote device, wherein the control characters synchronize protocol settings between the computer system and the remote device to thereby provide compatible operation and synchronization of the textual characters between the vertical areas.

20. The computer-readable medium of claim 19 whose contents cause a computer system to further perform the step of:

preventing the display of the control characters on the display screen of the computer system.

* * * * *